US011059327B2

(12) United States Patent
Suzuki et al.

(10) Patent No.: US 11,059,327 B2
(45) Date of Patent: Jul. 13, 2021

(54) PNEUMATIC TIRE

(71) Applicant: The Yokohama Rubber Co., LTD., Tokyo (JP)

(72) Inventors: Naoko Suzuki, Hiratsuka (JP); Hiromitsu Takei, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 507 days.

(21) Appl. No.: 15/505,031

(22) PCT Filed: Aug. 3, 2015

(86) PCT No.: PCT/JP2015/071954
§ 371 (c)(1),
(2) Date: Feb. 17, 2017

(87) PCT Pub. No.: WO2016/027647
PCT Pub. Date: Feb. 25, 2016

(65) Prior Publication Data
US 2017/0267030 A1 Sep. 21, 2017

(30) Foreign Application Priority Data

Aug. 19, 2014 (JP) .............................. JP2014-166830

(51) Int. Cl.
*B60C 11/03* (2006.01)
*B60C 11/12* (2006.01)
*B60C 11/13* (2006.01)

(52) U.S. Cl.
CPC ...... *B60C 11/0302* (2013.01); *B60C 11/0304* (2013.01); *B60C 11/12* (2013.01);
(Continued)

(58) Field of Classification Search
CPC . B60C 11/12; B60C 11/0304; B60C 11/1236; B60C 11/1392; B60C 2011/0381; B60C 2011/0383
See application file for complete search history.

(56) References Cited

U.S. PATENT DOCUMENTS 4,057,089 A * 11/1977 Johannsen .......... B60C 11/0302
152/209.18
4,702,292 A 10/1987 Brayer
(Continued)

FOREIGN PATENT DOCUMENTS

CN 101811420 8/2010
EP 618091 A1 * 10/1994
(Continued)

OTHER PUBLICATIONS

Machine translation for Japan 07-164826 (Year: 2019).*
(Continued)

*Primary Examiner* — Steven D Maki
(74) *Attorney, Agent, or Firm* — Thorpe North & Western

(57) ABSTRACT

A pneumatic tire is equipped with: a first circumferential groove and a second circumferential groove which are formed on a tread surface of a tread portion and extend along a tire circumferential direction while being arranged side by side in a tire width direction interposing an equatorial plane of the tire therebetween; a plurality of first auxiliary grooves which are arranged in the tire circumferential direction, disposed intersecting the tire circumferential direction, and communicate with the second circumferential groove by passing through the first circumferential groove, and a plurality of second auxiliary grooves which are arranged in the tire circumferential direction, disposed intersecting the tire circumferential direction so as to incline in the tire width direction, communicate with the second circumferential groove, and bend continuously with respect to the first auxiliary groove bounded at the second circumferential groove.

23 Claims, 12 Drawing Sheets

(52) U.S. Cl.
CPC ...... *B60C 11/1204* (2013.01); *B60C 11/1236* (2013.01); *B60C 11/1392* (2013.01); *B60C 2011/036* (2013.01); *B60C 2011/0341* (2013.01); *B60C 2011/0346* (2013.01); *B60C 2011/0353* (2013.01); *B60C 2011/0381* (2013.01); *B60C 2011/0383* (2013.01)

(56) References Cited

U.S. PATENT DOCUMENTS

| | | | |
|---|---|---|---|
| D304,918 S * | 12/1989 | Hinrichsen | D12/597 |
| 5,213,641 A | 5/1993 | Tsuda et al. | |
| 5,291,929 A | 3/1994 | Daisho et al. | |
| 5,529,101 A | 6/1996 | Croyle et al. | |
| 2002/0053382 A1 | 5/2002 | Mori et al. | |
| 2002/0134477 A1* | 9/2002 | Cantu' | B60C 11/0302 152/209.9 |
| 2003/0226629 A1* | 12/2003 | Kimishima | B60C 11/0306 152/209.18 |
| 2008/0185084 A1* | 8/2008 | Dumigan | B60C 11/0306 152/209.15 |
| 2009/0188596 A1* | 7/2009 | Koji ma | B60C 11/0309 152/209.8 |
| 2010/0132864 A1 | 6/2010 | Colombo et al. | |
| 2012/0111466 A1 | 5/2012 | Takano | |
| 2012/0261044 A1* | 10/2012 | Numata | B60C 11/0304 152/209.8 |
| 2012/0261045 A1* | 10/2012 | Matsushita | B60C 11/1392 152/209.18 |
| 2013/0133797 A1* | 5/2013 | Takagi | B60C 11/03 152/209.8 |
| 2015/0183273 A1 | 7/2015 | Colombo et al. | |
| 2018/0079260 A1* | 3/2018 | Suzuki | B60C 11/0302 |

FOREIGN PATENT DOCUMENTS

| | | | |
|---|---|---|---|
| EP | 2138327 A1 * | 12/2009 | |
| JP | 60-018003 U * | 2/1985 | |
| JP | S60-018003 | 2/1985 | |
| JP | 61-098601 A * | 5/1986 | |
| JP | S62-218206 | 9/1987 | |
| JP | H02-041909 | 2/1990 | |
| JP | H02-254002 | 10/1990 | |
| JP | H05-124406 | 5/1993 | |
| JP | H06-017602 | 5/1994 | |
| JP | 06-247110 A * | 9/1994 | |
| JP | 07-164826 A * | 6/1995 | |
| JP | H07-186626 | 7/1995 | |
| JP | 2002-087022 | 3/2002 | |
| JP | 2003-326919 | 11/2003 | |
| JP | 2006-123609 A * | 5/2006 | |
| JP | 2010-006155 | 1/2010 | |
| JP | 2010-513117 | 4/2010 | |
| JP | 2010-208616 | 9/2010 | |
| JP | 2012-101572 | 5/2012 | |
| JP | 2012-218633 | 11/2012 | |
| JP | 2012-218651 | 11/2012 | |
| JP | 2013-112056 | 6/2013 | |
| JP | 2013-112061 | 6/2013 | |
| WO | WO 2008/074353 | 6/2008 | |

OTHER PUBLICATIONS

Machine translation for Japan 06-247110 (Year: 2019).*
Machine translation for Europe 618091 (Year: 2019).*
Machine translation for Japan 61-098601 (Year: 2019).*
Machine translation for Japan 60-018003 U (Year: 2019).*
Machine translation for Europe 2138327 (Year: 2020).*
Machine translation for Japan 2006-123609 (Year: 2021).*
International Search Report for International Application No. PCT/JP2015/071954 dated Oct. 27, 2015, 5 pages, Japan.

* cited by examiner

|  | Conventional Example 1 | Comparative Example 1 | Working Example 1 | Working Example 2 | Working Example 3 | Working Example 4 |
|---|---|---|---|---|---|---|
| No. of circumferential grooves | 4 | 4 | 4 | 4 | 4 | 4 |
| First auxiliary groove shape | Straight line in width direction | Straight line in width direction | Incline in width direction | Straight line in width direction | Incline in width direction | Incline in width direction |
| First auxiliary groove width | Parallel | Parallel | Parallel | Parallel | Parallel | Parallel |
| Second auxiliary groove shape | Straight line in width direction | Straight line in width direction | Straight line in width direction | Incline in width direction | Incline in width direction | Incline in width direction |
| Second auxiliary groove width | Parallel | Parallel | Parallel | Parallel | Parallel | Parallel |
| First auxiliary groove and second auxiliary groove connected at second circumferential groove | ○ | - | ○ | ○ | ○ | ○ |
| Specification when to be mounted to vehicle | - | - | - | - | - | ○ |
| Second circumferential groove width | Same as others | Same as others | Same as others | Same as others | Same as others | Narrower |
| First narrow groove | Shoulder only | Shoulder only | Shoulder only | Shoulder only | Shoulder only | Shoulder only |
| Set of first narrow grooves | - | - | - | - | - | - |
| Fourth circumferential groove | - | Straight line | - | - | - | - |
| Third auxiliary groove | Communicating | Non-communicating | Communicating | Communicating | Communicating | Communicating |
| Fourth auxiliary groove | Straight line | Straight line | Straight line | Straight line | Straight line | Straight line |
| Second narrow groove | Single | Single | Single | Single | Single | Single |
| Chamfer | - | - | - | - | - | - |
| Narrow groove width | 1.0 | 1.5 | 1.5 | 1.5 | 1.5 | 1.5 |
| Braking performance on snow-covered road surface | 100 | 100 | 103 | 105 | 105 | 106 |
| Braking performance on wet road surface | 100 | 103 | 103 | 103 | 103 | 105 |
| Braking performance on dry road surface | 100 | 100 | 100 | 100 | 103 | 103 |

FIG. 7A

| | Working Example 5 | Working Example 6 | Working Example 7 | Working Example 8 | Working Example 9 | Working Example 10 |
|---|---|---|---|---|---|---|
| No. of circumferential grooves | 4 | 4 | 4 | 4 | 4 | 4 |
| First auxiliary groove shape | Incline in width direction | Incline in width direction | Incline in width direction | Incline in width direction | Incline in width direction | Incline in width direction |
| First auxiliary groove width | Parallel | Parallel | Parallel | Parallel | Parallel | Parallel |
| Second auxiliary groove shape | Incline in width direction | Incline in width direction | Incline in width direction | Incline in width direction | Incline in width direction | Incline in width direction |
| Second auxiliary groove width | Parallel | Parallel | Parallel | Parallel | Parallel | Parallel |
| First auxiliary groove and second auxiliary groove connected at second circumferential groove | ○ | ○ | ○ | ○ | ○ | ○ |
| Specification when to be mounted to vehicle | ○ | ○ | ○ | ○ | ○ | ○ |
| Second circumferential groove width | Narrower | Narrower | Narrower | Narrower | Narrower | Narrower |
| First narrow groove | Passes through to center | Passes through to center | Passes through to center | Passes through to center | Passes through to center | Passes through to center |
| Set of first narrow grooves | - | ○ | ○ | ○ | ○ | ○ |
| Fourth circumferential groove | - | - | Zigzag | Zigzag | Zigzag | Zigzag |
| Third auxiliary groove | Communicating | Communicating | Communicating | Non-communicating | Non-communicating | Non-communicating |
| Fourth auxiliary groove | Straight line | Straight line | Straight line | Straight line | Bending | Bending |
| Second narrow groove | Single | Single | Single | Single | Single | Set |
| Chamfer | - | - | - | - | - | - |
| Narrow groove width | 1.5 | 1.5 | 1.5 | 1.5 | 1.5 | 1.5 |
| Braking performance on snow-covered road surface | 106 | 106 | 108 | 109 | 110 | 110 |
| Braking performance on wet road surface | 106 | 107 | 107 | 107 | 108 | 110 |
| Braking performance on dry road surface | 103 | 103 | 104 | 104 | 105 | 105 |

FIG. 7B

| | Working Example 11 | Working Example 12 | Working Example 13 | Working Example 14 | Working Example 15 | Working Example 16 |
|---|---|---|---|---|---|---|
| No. of circumferential grooves | 4 | 4 | 4 | 4 | 4 | 4 |
| First auxiliary groove shape | Incline in width direction | Incline in width direction | Incline in width direction | Incline in width direction | Incline in width direction | Incline in width direction |
| First auxiliary groove width | Wide width on outer side | Wide width on outer side | Wide width on outer side | Wide width on outer side | Wide width on outer side | Wide width on outer side |
| Second auxiliary groove shape | Incline in width direction | Incline in width direction | Incline in width direction | Incline in width direction | Incline in width direction | Incline in width direction |
| Second auxiliary groove width | Wide width on outer side | Wide width on outer side | Wide width on outer side | Wide width on outer side | Wide width on outer side | Wide width on outer side |
| First auxiliary groove and second auxiliary groove connected at second circumferential groove | ○ | ○ | ○ | ○ | ○ | ○ |
| Specification when to be mounted to vehicle | ○ | ○ | ○ | ○ | ○ | ○ |
| Second circumferential groove width | Narrower | Narrower | Narrower | Narrower | Narrower | Narrower |
| First narrow groove | Passes through to center | Passes through to center | Passes through to center | Passes through to center | Passes through to center | Passes through to center |
| Set of first narrow grooves | ○ | ○ | ○ | ○ | ○ | ○ |
| Fourth circumferential groove | Zigzag | Zigzag | Zigzag | Zigzag | Zigzag | Zigzag |
| Third auxiliary groove | Non-communicating | Non-communicating | Non-communicating | Non-communicating | Non-communicating | Non-communicating |
| Fourth auxiliary groove | Bending | Bending | Bending | Bending | Bending | Bending |
| Second narrow groove | Set | Set | Set | Set | Set | Set |
| Chamfer | - | Symmetric | Inverted | Inverted | Inverted | Inverted |
| Narrow groove width | 1.5 | 1.5 | 1.5 | 0.4 | 1.2 | 1.0 |
| Braking performance on snow-covered road surface | 113 | 113 | 115 | 116 | 117 | 117 |
| Braking performance on wet road surface | 110 | 110 | 110 | 113 | 113 | 114 |
| Braking performance on dry road surface | 105 | 106 | 107 | 108 | 109 | 109 |

FIG. 7C

|  |  | Conventional Example 2 | Working Example 17 | Working Example 18 | Working Example 19 | Working Example 20 | Working Example 21 |
|---|---|---|---|---|---|---|---|
| Third narrow groove | Arrangement | Single | Set: Parallel | Set: Parallel | Set: Parallel | Set: Narrows | Set: Widens |
|  | Groove width with respect to fifth auxiliary groove width | Same | Same | Wider | Narrower | Narrower | Narrower |
|  | Angle A | - | 0 | 0 | 0 | - | 80 |
|  | Different straight lines or curved lines | - | - | - | - | - | - |
|  | Three reference lines | - | - | - | - | - | - |
|  | Angles a, b | 0 | 0 | 0 | 0 | 0 | 0 |
|  | Angles c, d | 0 | 0 | 0 | 0 | 0 | 0 |
| Fifth auxiliary groove | Arrangement with respect to third narrow groove | Parallel | Parallel | Parallel | Parallel | Non-parallel | Non-parallel |
|  | Groove width with respect to third narrow groove width | Same | Same | Narrower | Wider | Wider | Wider |
|  | Angle α | - | 0 | 0 | 0 | - | 50 |
|  | Angle β | - | 0 | 0 | 0 | - | 30 |
|  | Groove width | Parallel | Parallel | Parallel | Parallel | Parallel | Parallel |
| Second circumferential groove width |  | Same as others | Same as others | Same as others | Narrower | Narrower | Narrower |
| Land portion where disposed |  | Middle | Middle | Middle | Middle | Middle | Middle |
| Narrow groove width |  | 1.0 | 1.5 | 1.5 | 1.5 | 1.5 | 1.5 |
| Braking performance on snow-covered road surface |  | 100 | 112 | 112 | 113 | 114 | 114 |
| Braking performance on wet road surface |  | 100 | 111 | 112 | 112 | 112 | 112 |
| Braking performance on dry road surface |  | 100 | 109 | 109 | 109 | 109 | 110 |

FIG. 8A

|  |  | Working Example 22 | Working Example 23 | Working Example 24 | Working Example 25 | Working Example 26 | Working Example 27 | Working Example 28 |
|---|---|---|---|---|---|---|---|---|
| Third narrow groove | Arrangement | Set: Widens | Set: Widens | Set: Widens | Set: Widens | Set: Widens | Set: Widens | Set: Widens |
|  | Groove width with respect to fifth auxiliary groove width | Narrower | Narrower | Narrower | Narrower | Narrower | Narrower | Narrower |
|  | Angle A | 10 | 50 | 30 | 30 | 30 | 30 | 30 |
|  | Different straight lines or curved lines | - | - | - | - | Zigzag | Wave | - |
|  | Three reference lines | - | - | - | - | - | - | ○ |
|  | Angles a, b | 0 | 0 | 0 | 0 | - | - | 3 |
|  | Angles c, d | 0 | 0 | 0 | 0 | - | - | 3 |
| Fifth auxiliary groove | Arrangement with respect to third narrow groove | Non-parallel | Non-parallel | Non-parallel | Non-parallel | Non-parallel | Non-parallel | Non-parallel |
|  | Groove width with respect to third narrow groove width | Wider | Wider | Wider | Wider | Wider | Wider | Wider |
|  | Angle $\alpha$ | 9 | 30 | 25 | 25 | 25 | 25 | 25 |
|  | Angle $\beta$ | 1 | 20 | 5 | 5 | 5 | 5 | 5 |
| Groove width |  | Parallel | Parallel | Parallel | Parallel | Parallel | Parallel | Parallel |
| Second circumferential groove width |  | Narrower | Narrower | Narrower | Narrower | Narrower | Narrower | Narrower |
| Land portion where disposed |  | Middle | Middle | Middle | Middle | Middle | Middle | Middle |
| Narrow groove width |  | 1.5 | 1.5 | 1.5 | 1.5 | 1.5 | 1.5 | 1.5 |
| Braking performance on snow-covered road surface |  | 114 | 115 | 115 | 115 | 115 | 115 | 115 |
| Braking performance on wet road surface |  | 113 | 113 | 113 | 113 | 114 | 114 | 115 |
| Braking performance on dry road surface |  | 110 | 110 | 111 | 111 | 111 | 112 | 112 |

FIG. 8B

|  |  | Working Example 29 | Working Example 30 | Working Example 31 | Working Example 32 | Working Example 33 | Working Example 34 | Working Example 35 |
|---|---|---|---|---|---|---|---|---|
| Third narrow groove | Arrangement | Set: Widens | Set: Widens | Set: Widens | Set: Widens | Set: Widens | Set: Widens | Set: Widens |
|  | Groove width with respect to fifth auxiliary groove width | Narrower | Narrower | Narrower | Narrower | Narrower | Narrower | Narrower |
|  | Angle A | 30 | 30 | 30 | 30 | 30 | 30 | 30 |
|  | Different straight lines or curved lines | - | - | - | - | - | - | - |
|  | Three reference lines | ○ | ○ | ○ | ○ | ○ | ○ | ○ |
|  | Angles a, b | 5 | 20 | 10 | 10 | 10 | 10 | 10 |
|  | Angles c, d | 5 | 20 | 10 | 10 | 10 | 10 | 10 |
| Fifth auxiliary groove | Arrangement with respect to third narrow groove | Non-parallel | Non-parallel | Non-parallel | Non-parallel | Non-parallel | Non-parallel | Non-parallel |
|  | Groove width with respect to third narrow groove width | Wider | Wider | Wider | Wider | Wider | Wider | Wider |
|  | Angle α | 25 | 25 | 25 | 25 | 25 | 25 | 25 |
|  | Angle β | 5 | 5 | 5 | 5 | 5 | 5 | 5 |
|  | Groove width | Parallel | Parallel | Gradually decreasing toward terminating end side | Gradually decreasing toward terminating end side | Gradually decreasing toward terminating end side | Gradually decreasing toward terminating end side | Gradually decreasing toward terminating end side |
| Second circumferential groove width |  | Narrower | Narrower | Narrower | Narrower | Narrower | Narrower | Narrower |
| Land portion where disposed |  | Middle | Middle | Middle | Center | Center | Center | Center |
| Narrow groove width |  | 1.5 | 1.5 | 1.5 | 1.5 | 0.4 | 1.2 | 1.0 |
| Braking performance on snow-covered road surface |  | 116 | 116 | 117 | 117 | 118 | 118 | 119 |
| Braking performance on wet road surface |  | 115 | 115 | 116 | 117 | 117 | 117 | 118 |
| Braking performance on dry road surface |  | 112 | 112 | 112 | 112 | 113 | 113 | 114 |

FIG. 8C

PNEUMATIC TIRE

TECHNICAL FIELD

The present technology relates to a pneumatic tire that is capable of achieving good braking performance on a dry road surface, a wet road surface, and a snow-covered road surface.

BACKGROUND ART

Conventionally, pneumatic tires have been known that include a circumferential groove extending in a tire circumferential direction, and a lateral groove extending at an incline to a tire width direction, on a tread surface.

For example, a pneumatic tire set forth in Japanese Unexamined Patent Application No. H05-124406A aims to have excellent water drainage efficiency during straight travel and cornering on a wet road surface. This pneumatic tire is provided with a plurality of lateral grooves disposed in V-shapes toward one direction in the tire circumferential direction. Then, apexes of the V-shapes of the lateral grooves are arranged on circumferential grooves and disposed off-center with respect to a tire equator line.

Also, for example, a pneumatic tire set forth in Japanese Unexamined Patent Application No. 2013-112056A aims to improve traction performance on icy and snowy road surfaces. This pneumatic tire is provided with a plurality of first lateral grooves and second lateral grooves spaced apart in the tire circumferential direction. Each of the first lateral grooves and the second lateral grooves gradually extends from one side toward the other side in the tire circumferential direction, from near a tire equator of the tread surface toward both outer sides in the tire width direction. These first lateral grooves and second lateral grooves are alternately linked to a circumferential groove near the tire equator.

Further, for example, a pneumatic tire set forth in Japanese Unexamined Patent Application Publication No. 2010-513117A aims to be especially suitable for driving on snow and ice, and have favorable driving performance on a wet road surface and a dry road surface. This pneumatic tire includes two circumferential grooves that define a first shoulder region, a second shoulder region, and at least one center region, and a plurality of asymmetric lateral grooves that have substantially V shapes, are provided in the tire circumferential direction extending across an entire width of the tread, are asymmetrical in the tire width direction, and are alternately disposed in the tire circumferential direction. This asymmetric lateral groove includes a V-shaped peak portion disposed in the center region.

In the pneumatic tire of Japanese Unexamined Patent Application No. H05-124406A described above, the apexes of the V-shapes of the lateral grooves are arranged on the plurality of the circumferential grooves, and disposed off-center with respect to the tire equator line. As a result, shapes of blocks formed by the circumferential grooves and the lateral grooves become non-uniform and edges of the blocks are disposed in a non-uniform manner in the tire circumferential direction, causing inadequate braking performance on a snow-covered road surface.

Further, in the pneumatic tire of Japanese Unexamined Patent Application No. 2013-112056A described above, the first lateral grooves and the second lateral grooves are alternately linked to the circumferential groove near the tire equator. As a result, the circumferential groove is interposed between the first lateral grooves and the second lateral grooves, causing failure to improve the water drainage properties between the first lateral grooves and the second lateral grooves, and inadequate braking performance on a wet road surface.

Further, in the pneumatic tire of Japanese Unexamined Patent Application Publication No. 2010-513117A described above, the V-shaped peak portions of the asymmetric lateral grooves are disposed on a land portion of the center region, causing failure to improve the water drainage properties of the V-shaped peak portions and inadequate braking performance on a wet road surface.

SUMMARY

The present technology provides a pneumatic tire that is capable of achieving good braking performance on a dry road surface, a wet road surface, and a snow-covered road surface.

A pneumatic tire according to a first aspect of the present technology includes a first circumferential groove and a second circumferential groove that are provided on a tread surface of a tread portion and extend along a tire circumferential direction while being arranged side by side in a tire width direction interposing a tire equatorial plane therebetween, a plurality of first auxiliary grooves that are formed in the tire circumferential direction, disposed intersecting the tire circumferential direction, and communicate with the second circumferential groove by passing through the first circumferential groove, and a plurality of second auxiliary grooves that are formed in the tire circumferential direction, disposed intersecting the tire circumferential direction so as to incline in the tire width direction, communicate with the second circumferential groove, and bend continuously with respect to the first auxiliary groove bounded by the second circumferential groove.

According to this pneumatic tire, the first auxiliary grooves and the second auxiliary grooves communicating with the second circumferential groove are bent bounded by the second circumferential groove, thereby causing at least one of the auxiliary grooves to incline in the tire width direction and thus improving a rigidity of defined land portions. Moreover, the first auxiliary grooves and the second auxiliary grooves that communicate with the second circumferential groove bend continuously bounded by the second circumferential groove, thereby improving the water drainage performance in the tire width direction. Moreover, the first auxiliary grooves pass through the first circumferential groove arranged side by side with the second circumferential groove, thereby causing a land portion between the first circumferential groove and the second circumferential groove to be formed into a block shape and thus improving an edge effect. As a result, the braking performance on a dry road surface is enhanced by the improvement in rigidity of the land portion, the braking performance on a wet road surface is enhanced by the improvement in water drainage performance, and the braking performance on a snow-covered road surface is enhanced by the edge effect.

A pneumatic tire according to a second aspect of the present technology is the pneumatic tire according to the first aspect, further including third circumferential grooves that extend along the tire circumferential direction on a vehicle inner side of the first circumferential groove and a vehicle outer side of the second circumferential groove, respectively. The vehicle inner side and the vehicle outer side are designated when the tire is to be mounted to a vehicle, with the first circumferential groove being disposed on the vehicle inner side, and the second circumferential groove being disposed on the vehicle outer side. Each of the first, the second and the third circumferential grooves defines a center land portion on the tire equatorial plane, each middle land portion on both outer sides in the tire width direction of the center land portion, and a shoulder land portion on an outer side in the tire width direction of each of the middle land portions. The second circumferential groove is formed with a narrower width than that of the first and the third circumferential grooves, and the first auxiliary grooves are each provided so as to pass through the third circumferential groove disposed on the vehicle inner side of the first circumferential groove, thereby passing through the shoulder land portion on the vehicle inner side, the middle land portion on the vehicle inner side, and the center land portion. The second auxiliary grooves are each provided so as to communicate with the third circumferential groove disposed on the vehicle outer side of the second circumferential groove, thereby passing through the middle land portion on the vehicle outer side.

According to this pneumatic tire, the second circumferential groove is disposed on the vehicle outer side of the center land portion on the tire equatorial plane and is formed with a narrower width than that of the other circumferential grooves, thereby increasing the dimensions in the tire width direction of the shoulder land portion and the middle land portion on the vehicle outer side that contributes to braking performance on a dry road surface, and thus improving the rigidity of the land portions. Moreover, on the vehicle inner side that contributes to braking performance on a wet road surface and a snow-covered road surface, the first auxiliary grooves pass through the shoulder land portion, the middle land portion, and the center land portion, thereby improving water drainage properties. Furthermore, the land portions on the vehicle inner side are thus formed into block shapes, improving the edge effect. This makes it possible to enhance the improvement effect of the braking performance on a dry road surface, a wet road surface, and a snow-covered road surface.

Further, a pneumatic tire according to a third aspect of the present technology is the pneumatic tire according to the second aspect, further including a first narrow groove provided so as to extend from the shoulder land portion on the vehicle inner side, through the middle land portion on the vehicle inner side, and to the center land portion. This first narrow groove is formed with a narrower groove width than that of the first auxiliary groove.

According to this pneumatic tire, the first narrow groove is provided, thereby improving the edge effect and making it possible to enhance the improvement effect of the braking performance on a snow-covered road surface.

Further, a pneumatic tire according to a fourth aspect of the present technology is the pneumatic tire according to the third aspect, wherein a plurality of the first narrow grooves are disposed as sets of a plurality of grooves arranged side by side in the tire circumferential direction. Each of the first narrow grooves includes a first end portion and a second end portion. The respective first end portions are linked in the shoulder land portion on the vehicle inner side, and the respective second end portions terminate in the center land portion.

According to this pneumatic tire, the edge effect is further improved and it is possible to enhance the improvement effect of the braking performance on a snow-covered road surface. Moreover, the plurality of first narrow grooves are disposed as sets of a plurality of grooves arranged side by side in the tire circumferential direction, and the respective first end portions are linked in the shoulder land portion on the vehicle inner side, thereby improving the water drainage properties and thus making it possible to enhance the improvement effect of the braking performance on a wet road surface.

Further, a pneumatic tire according to a fifth aspect of the present technology is the pneumatic tire according to any one of the second to fourth aspects, further including a fourth circumferential groove that extends in a zigzag manner along the tire circumferential direction in the middle land portion on the vehicle inner side, and is formed with a narrower groove width than those of the first, the second and the third circumferential grooves.

According to this pneumatic tire, the zigzag shape prevents collapse of the middle land portion on the vehicle inner side in the tire width direction and improves the rigidity of the middle land portion, thereby making it possible to enhance the effect of improving the braking performance on a dry road surface. Moreover, the zigzag shape makes it possible to improve the edge effect and enhance the improvement effect of the braking performance on a snow-covered road surface.

Further, a pneumatic tire according to a sixth aspect of the present technology is the pneumatic tire according to any one of the second to fifth aspects, further including a plurality of third auxiliary grooves that are formed in the shoulder land portion on the vehicle outer side, arranged side by side in the tire circumferential direction, and disposed intersecting the tire circumferential direction. Each of these third auxiliary grooves includes an end portion formed away from the third circumferential groove on the vehicle outer side.

According to this pneumatic tire, the edge effect of the third auxiliary grooves makes it is possible to enhance the improvement effect of the braking performance on a snow-covered road surface. Moreover, the end portion of each of the third auxiliary grooves is formed away from the third circumferential groove on the vehicle outer side, thereby improving the rigidity of the shoulder land portion on the vehicle outer side and thus making it possible to enhance the effect of improving the braking performance on a dry road surface.

Further, a pneumatic tire according to a seventh aspect of the present technology is the pneumatic tire according to any one of the second to sixth aspects, further including a plurality of fourth auxiliary grooves that are formed in the center land portion and the middle land portion on the vehicle outer side, arranged side by side in the tire circumferential direction, and disposed intersecting the tire circumferential direction. Each of these fourth auxiliary grooves includes two end portions that pass through the second circumferential groove, terminate in both of the land portions, and are bent bounded by the second circumferential groove.

According to this pneumatic tire, the end portions of the fourth auxiliary grooves terminate in both land portions, thereby improving the rigidity of each land portion and thus making it possible to enhance the effect of improving the braking performance on a dry road surface. Moreover, the fourth auxiliary grooves are bent bounded by the second circumferential groove, thereby improving the water drainage performance in the tire width direction and thus making it possible to enhance the improvement effect of the braking performance on a wet road surface. Moreover, the fourth auxiliary grooves are bent bounded by the second circumferential groove, thereby improving the edge effect and thus making it possible to enhance the improvement effect of the braking performance on a snow-covered road surface.

Further, a pneumatic tire according to an eighth aspect of the present technology is the pneumatic tire according to any one of the second to seventh aspects, further including a plurality of second narrow grooves that are provided on the shoulder land portion on the vehicle outer side, disposed as sets of a plurality of grooves arranged side by side in the tire circumferential direction, and disposed intersecting the tire circumferential direction. Each of these second narrow grooves includes a first end portion and a second end portion. The respective first end portions communicate with the third circumferential groove on the vehicle outer side, and the respective second end portions are linked.

According to this pneumatic tire, the second narrow grooves are provided, thereby improving the edge effect and making it possible to enhance the improvement effect of the braking performance on a snow-covered road surface. Moreover, the plurality of second narrow grooves are disposed as sets of a plurality of grooves arranged side by side in the tire circumferential direction, thereby further improving the edge effect and making it possible to enhance the improvement effect of the braking performance on a snow-covered road surface. Moreover, the plurality of second narrow grooves are disposed as sets of a plurality of grooves arranged side by side in the tire circumferential direction, and the respective second end portions linked in the vehicle outer side shoulder land portion, thereby improving the water drainage properties and thus making it possible to enhance the improvement effect of the braking performance on a wet road surface.

Further, a pneumatic tire according to a ninth aspect of the present technology is the pneumatic tire according to any one of the first to eighth aspects, wherein the first auxiliary grooves are each formed with a groove width that gradually increases in a direction away from the second auxiliary grooves, and the second auxiliary grooves are each formed with a groove width that gradually increases in a direction away from the first auxiliary grooves.

According to this pneumatic tire, the water drainage properties are improved, making it possible to enhance the improvement effect of the braking performance on a wet road surface.

Further, a pneumatic tire according to a tenth aspect of the present technology is the pneumatic tire according to any one of the first to ninth aspects, wherein the second circumferential groove includes chamfers on opening edges on both sides in the tire width direction.

According to this pneumatic tire, the chamfers improve the edge effect, making it possible to enhance the improvement effect of the braking performance on a snow-covered road surface.

Further, a pneumatic tire according to an eleventh aspect of the present technology is the pneumatic tire according to the tenth aspect, wherein the chamfers are each formed with a chamfer width that gradually varies in the tire circumferential direction between each of the first auxiliary grooves and between each of the second auxiliary grooves, and are disposed so as to be inverted at the opening edges on both sides of the second circumferential groove.

According to this pneumatic tire, the chamfers are alternately formed inverted on the opening edges on both sides of the second circumferential groove, thereby improving snow discharge properties and thus making it possible to enhance the improvement effect of the braking performance on a snow-covered road surface.

Further, a pneumatic tire according to a twelfth aspect of the present technology is the pneumatic tire according to any one of the first to eleventh aspects, further including, in a land portion defined by the first circumferential groove and the second circumferential groove, a plurality of third narrow grooves and a fifth auxiliary groove. The third narrow grooves are disposed as sets of two grooves arranged side by side in the tire circumferential direction, disposed intersecting the tire circumferential direction, communicate with the first circumferential groove, and terminate within the land portion. The fifth auxiliary groove is disposed intersecting the tire circumferential direction, communicates with the second circumferential groove, and terminates within the land portion. A terminating end portion of the fifth auxiliary groove is disposed between terminating end portions of each of the sets of third narrow grooves in the tire circumferential direction.

According to this pneumatic tire, the fifth auxiliary groove improves the water drainage properties, making it possible to enhance the improvement effect of the braking performance on a wet road surface. Moreover, the third narrow grooves improve the edge effect, making it possible to enhance the improvement effect of the braking performance on a snow-covered road surface. Moreover, the third narrow grooves and the fifth auxiliary groove terminate within the center land portion, and the position of the terminating end portion of the fifth auxiliary groove is disposed between the terminating end portions of each of the sets of third narrow grooves in the tire circumferential direction, thereby improving the rigidity of the land portion and making it possible to enhance the effect of improving the braking performance on a dry road surface.

Further, a pneumatic tire according to a thirteenth aspect of the present technology is the pneumatic tire according to the twelfth aspect, wherein the second circumferential groove is formed with a narrower groove width than that of the first circumferential groove, and the third narrow grooves are formed with a narrower groove width than that of the fifth auxiliary groove.

According to this pneumatic tire, the groove width of the second circumferential groove is made narrower, making it possible to improve the rigidity of the land portions on both sides. Yet, water drainage properties tend to deteriorate. Compensation for this deterioration in water drainage properties can then be made by the fifth auxiliary groove having a wide groove width. Further, the third narrow grooves that communicate with the first circumferential groove having a wide groove width are each formed with a narrower groove width than that of the fifth auxiliary groove, making it possible to achieve a rigidity balance in the land portion between the first circumferential groove and the second circumferential groove and suppress uneven wear.

Further, a pneumatic tire according to a fourteenth aspect of the present technology is the pneumatic tire according to the twelfth or thirteenth aspect, wherein the sets of two third narrow grooves are formed extending from the communicating end portions toward the terminating end portions so as to spread in an angle range of from 10° to 50°, both inclusive. Further, the fifth auxiliary groove is formed extending from the terminating end portion toward the communicating end portion in an angle range of from 9° to 30°, both inclusive, with respect to one of the set of two third narrow grooves, and in an angle range of from 1° to 20°, both inclusive with respect to the other of the set of two third narrow grooves.

According to this pneumatic tire, each of the sets of two third narrow grooves is formed extending so as to spread, away from the fifth auxiliary groove, thereby making it possible to suppress a decrease in block rigidity and enhance the improvement effect of the braking performance on a snow-covered road surface by the edge effect of the third narrow grooves. Here, when an opening angle of each of the sets of two third narrow grooves is less than 10°, the third narrow grooves come close to being parallel, making it difficult to suppress a decrease in land portion rigidity. On the other hand, when the opening angle of each of the sets of two third narrow grooves exceeds 50°, the third narrow grooves come close to being in the tire circumferential direction, making it difficult to achieve the edge effect. As a result, each of the sets of two third narrow grooves is preferably formed extending from the communicating end portions to the terminating end portions so as to spread in the angle range of from 10° to 50°, both inclusive. Further, when an angle between the fifth auxiliary groove and one of the third narrow grooves is less than 9°, the fifth auxiliary groove and the one third narrow groove come close to being parallel, making it difficult to suppress a decrease in block rigidity. On the other hand, when the angle between the fifth auxiliary groove and the one third narrow groove exceeds 30°, an angle between the fifth auxiliary groove and the other of the third narrow grooves comes close to parallel, making it difficult to suppress a decrease in land portion rigidity. Further, when the angle between the fifth auxiliary groove and the other third narrow groove is less than 1°, the fifth auxiliary groove and the other third narrow groove come close to being parallel, making it difficult to suppress a decrease in land portion rigidity. On the other hand, when the angle between the fifth auxiliary groove and the other third narrow groove exceeds 20°, the angle between the fifth auxiliary groove and the one third narrow groove comes close to parallel, making it difficult to suppress a decrease in land portion rigidity. As a result, the fifth auxiliary groove is preferably formed extending from the terminating end portion toward the communicating end portion in the angle range of from 9° to 30°, both inclusive with respect to one of each of the sets of two third narrow grooves, and in the angle range of from 1° to 20°, both inclusive with respect to the other of each of the sets of two third narrow grooves.

Further, a pneumatic tire according to a fifteenth aspect of the present technology is the pneumatic tire according to any one of the twelfth to fourteenth aspects, wherein the third narrow grooves are each formed on the basis of at least two different straight lines or curved lines that are continuous.

According to this pneumatic tire, the third narrow grooves are each formed on the basis of at least two different straight lines or curved lines that are continuous, thereby improving the edge effect achieved by the third narrow grooves and thus making it possible to enhance the improvement effect of the braking performance on a snow-covered road surface.

Further, a pneumatic tire according to a sixteenth aspect of the present technology is the pneumatic tire according to any one of the twelfth to fourteenth aspects, wherein the third narrow grooves are each formed smoothly and continuously of three reference lines in the order of a first reference line, a second reference line, and a third reference line, from the communicating end portion toward the terminating end portion.

According to this pneumatic tire, the third narrow grooves are each formed smoothly and continuously of the three reference lines in order, thereby making it possible to suppress collapse of the land portion and enhance the effect of improving the braking performance on a dry road surface. Moreover, the third narrow grooves are each formed smoothly and continuously of the reference lines, thereby making it possible to improve the strength of the third narrow groove itself, achieve favorable grip properties, and enhance the effect of improving the braking performance on a dry road surface.

Further, a pneumatic tire according to a seventeenth aspect of the present technology is the pneumatic tire according to the sixteenth aspect, wherein each of the sets of third narrow grooves is formed so that, with respect to each straight line connecting the communicating end portion to the terminating end portion, each of the first reference lines that extends from the communicating end portion extends toward an inner side, and the first reference line and the straight line are formed in an angle range of from 5° to 20°, both inclusive.

When the first reference line that extends from the communicating end portion is less than 5° with respect to the straight line connecting the communicating end portion to the terminating end portion, that is, with respect to an overall extension direction of the third narrow groove, the third narrow groove comes close to being a straight line, making it difficult to achieve an action that suppresses collapse of the land portion. On the other hand, when the first reference line and the straight line exceed 20°, the third narrow groove significantly deviates from the overall extension direction, making it difficult to improve the strength of the third narrow groove itself and achieve an action that makes the grip properties favorable. As a result, the first reference line of the third narrow groove and the straight line are formed in an angle range of from 5° to 20°, both inclusive, thereby making it possible to suppress collapse of the land portion and better enhance the effect of improving the braking performance on a dry road surface, and making it possible to improve the strength of the third narrow groove itself and better enhance the effect of improving the braking performance on a dry road surface.

Further, a pneumatic tire according to an eighteenth aspect of the present technology is the pneumatic tire according to the sixteenth or seventeenth aspect, wherein each of the sets of third narrow grooves is formed so that, with respect to each straight line connecting the communicating end portion to the terminating end portion, each of the third reference lines that extends from the terminating end portion extends toward an inner side, and the third reference line and the straight line are formed in an angle range of from 5° to 20°, both inclusive.

When the third reference line that extends from the terminating end portion is less than 5° with respect to the straight line connecting the communicating end portion to the terminating end portion, that is, with respect to an overall extension direction of the third narrow groove, the third narrow groove comes close to being a straight line, making it difficult to achieve an action that suppresses collapse of the land portion. On the other hand, when the third reference line and the straight line exceed 20°, the third narrow groove significantly deviates from the overall extension direction, making it difficult to improve the strength of the third narrow groove itself and achieve an action that makes the grip properties favorable. As a result, the third reference line of the third narrow groove and the straight line are formed in an angle range of from 5° to 20°, both inclusive, thereby making it possible to suppress collapse of the land portion and better enhance the effect of improving the braking performance on a dry road surface, and making it possible to improve the strength of the third narrow groove itself and better enhance the effect of improving the braking performance on a dry road surface.

Further, a pneumatic tire according to a nineteenth aspect of the present technology is the pneumatic tire according to any one of the twelfth to eighteenth aspects, wherein the fifth auxiliary groove is formed with a groove width that is gradually decreasing from the communicating end portion toward the terminating end portion.

According to this pneumatic tire, the fifth auxiliary groove is formed so that a tip is increasingly narrower toward the land portion interior, thereby maintaining a ground contact surface area of the land portion, and making it possible to enhance the effect of improving the braking performance on a dry road surface.

Further, a pneumatic tire according to a twentieth aspect of the present technology is the pneumatic tire according to any one of the twelfth to nineteenth aspects, wherein the land portion where the third narrow grooves and the fifth auxiliary groove are provided is disposed on the tire equatorial plane.

According to this pneumatic tire, the land portion on the tire equatorial plane is the land portion that contacts the road surface the most, making it possible to retain the braking performance on a dry road surface. Further, the land portion that improves the braking performance on a snow-covered road surface is disposed on the tire equatorial plane, making it possible to remarkably achieve these effects.

Furthermore, a pneumatic tire according to a twenty-first aspect of the present technology is the pneumatic tire according to any one of the third, fourth, and eighth to twentieth aspects, wherein a groove width of the narrow groove is formed so as to be in a range of from not less than 0.4 mm to 1.2 mm, both inclusive.

According to this pneumatic tire, each of the narrow grooves is configured as a so-called sipe, thereby improving the edge effect and making it possible to enhance the improvement effect of the braking performance on a snow-covered road surface.

Advantageous Effect of Technology

The pneumatic tire according to the present technology makes it possible to achieve good braking performance on a dry road surface, a wet road surface, and a snow-covered road surface.

BRIEF DESCRIPTION OF DRAWINGS

FIGS. 7A-7C include a table showing results of performance tests on pneumatic tires according to working examples of the present technology.

FIGS. 8A-8C include a table showing results of performance tests on pneumatic tires according to the working examples of the present technology.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, a plurality of modified examples described in the embodiment may be combined as desired within the scope apparent to those skilled in the art.

Figure 1:
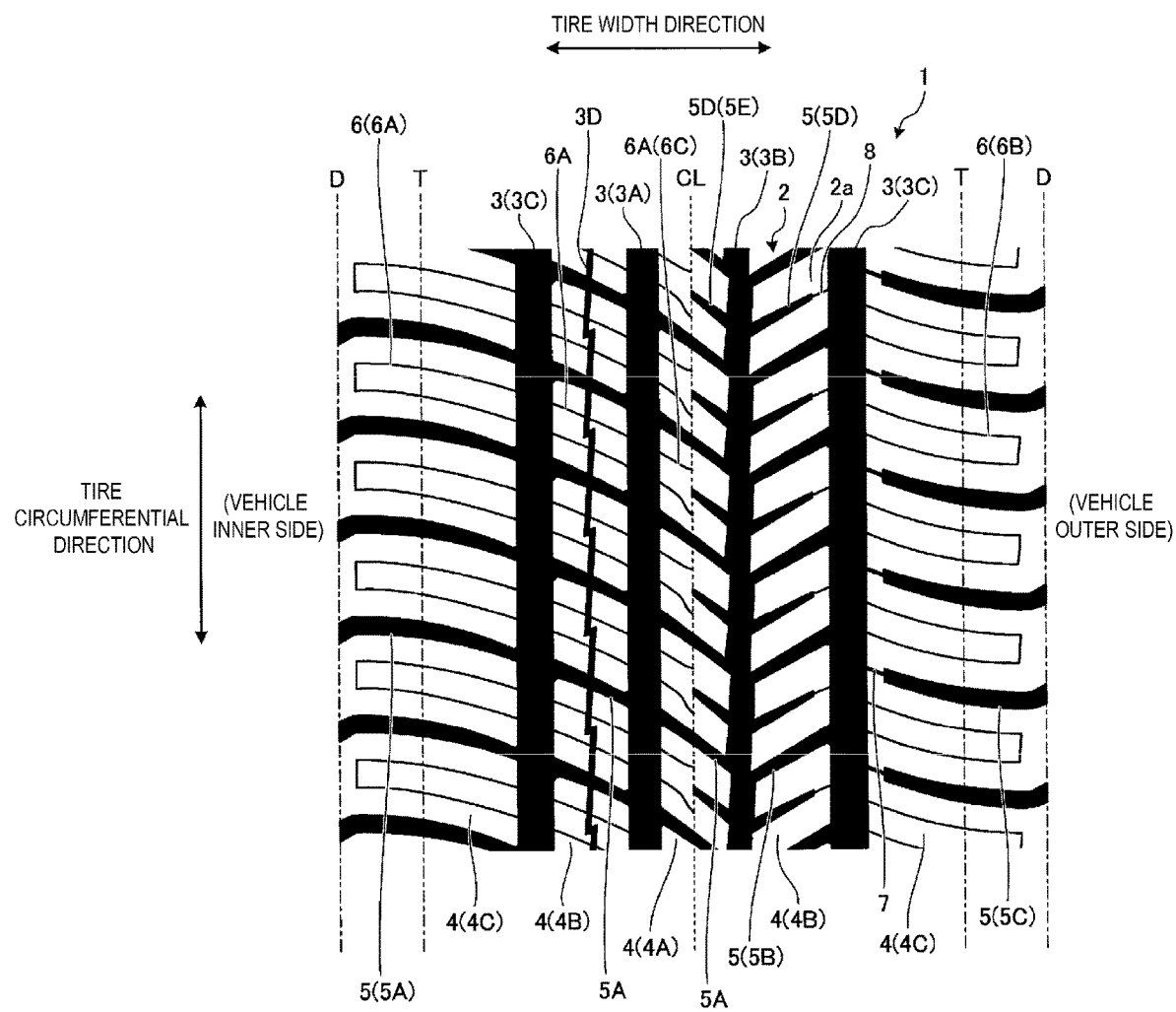
FIG. 1 is a plan view of a pneumatic tire according to an embodiment of the technology.

FIG. 1 is a plan view of a pneumatic tire according to the present embodiment.

In the following descriptions, "tire circumferential direction" refers to a circumferential direction with a rotational axis (not illustrated) as the center axis. In addition, "tire width direction" refers to a direction parallel to the rotational axis. "Inner side in the tire width direction" refers to a side approximate to a tire equatorial plane CL (tire equatorial line) in the tire width direction, and "outer side in the tire width direction" refers to a side away from the tire equatorial plane CL in the tire width direction. Furthermore, the tire equatorial plane CL is orthogonal to the rotational axis of a pneumatic tire 1, and is a plane passing through the center of the pneumatic tire 1 in terms of tire width. The tire equator line is a line that is on the tire equatorial plane CL and extends in the circumferential direction of the pneumatic tire 1. In the present embodiment, the tire equator line and the tire equatorial plane share the reference sign CL.

The pneumatic tire 1 of the present embodiment includes a tread portion 2, as illustrated in FIG. 1. The tread portion 2 is formed of a rubber material, and is exposed at an outermost side of the pneumatic tire 1 in the tire radial direction. The surface of the tread portion 2 is defined as a tread surface 2a that serves as a profile of the pneumatic tire 1. The vehicle inner/outer side orientation of the pneumatic tire 1 of the present embodiment may be designated by indicators provided on sidewall portions, which indicate the vehicle inner/outer side orientation when the pneumatic tire 1 is mounted to a vehicle, for example. Note that the designations of the vehicle inner side and the vehicle outer side are not limited to cases when the pneumatic tire 1 is mounted to the vehicle. For example, in cases when the pneumatic tire 1 is assembled on a rim, orientation of the rim with respect to the inner side and the outer side of the vehicle in the tire width direction is predetermined. Therefore, in cases when the pneumatic tire 1 is assembled on a rim, the orientation with respect to the vehicle inner side and the vehicle outer side in the tire width direction is designated.

The tread portion 2 includes a plurality (four in the present embodiment) of circumferential grooves 3 extending along the tire circumferential direction, being disposed side by side in the tire width direction on the tread surface 2a. Then, in the present embodiment, two circumferential grooves 3 are provided interposing the tire equatorial plane CL. Among these, one of the two circumferential grooves 3 interposing the tire equatorial plane CL is a first circumferential groove 3A, and the other is a second circumferential groove 3B. Further, each of the circumferential grooves 3 on the vehicle inner side of the first circumferential groove 3A and the vehicle outer side of the second circumferential groove 3B is a third circumferential groove 3C. Furthermore, the second circumferential groove 3B is formed with a narrower groove width (groove opening width in the tire width direction) than the other circumferential grooves (3A, 3C). Note that the circumferential grooves 3 have, for example, a groove width of from 5 mm to 15 mm, both inclusive, and a groove depth (dimension from an opening position of the tread surface 2a to a groove bottom) of from 5 mm to 15 mm, both inclusive.

The tread portion 2 includes a plurality (five in the present embodiment) of land portions 4 defined in the tire width direction by the circumferential grooves 3 on the tread surface 2a. Furthermore, the land portion 4, between the first circumferential groove 3A and the second circumferential groove 3B, on the tire equatorial plane CL is a center land portion 4A. Further, the land portion 4, between the first circumferential groove 3A and the vehicle inner side third circumferential groove 3C, on the vehicle inner side (outer side in the tire width direction) of the center land portion 4A is a vehicle inner side middle land portion 4B. Further, the land portion 4, between the second circumferential groove 3B and the vehicle outer side third circumferential groove 3C, on the vehicle outer side (outer side in the tire width direction) of the center land portion 4A is the vehicle outer side middle land portion 4B. Further, the land portion 4 on the vehicle innermost side (outer side in the tire width direction) of the vehicle inner side third circumferential groove 3C is a vehicle inner side shoulder land portion 4C. Further, the land portion 4 on the vehicle outermost side (outer side in the tire width direction) of the vehicle outer side third circumferential groove 3C is the vehicle outer side shoulder land portion 4C.

Further, the tread portion 2 includes a fourth circumferential groove 3D extending in a zigzag manner along the tire circumferential direction that is formed on the tread surface 2a of the vehicle inner side middle land portion 4B. The fourth circumferential groove 3D has, for example, a groove width of not less than 0.5 mm and not greater than those of the other circumferential grooves 3A, 3B, 3C, and a groove depth of not greater than those of the other circumferential grooves 3A, 3B, 3C.

In each of the land portions 4, a plurality of auxiliary grooves 5 and narrow grooves 6 are formed in the tread surface 2a, arranged sided by side in the tire circumferential direction, and disposed intersecting the tire circumferential direction. The narrow grooves 6 each, for example, has a groove width of from 0.4 mm to 1.2 mm, both inclusive, and a groove depth of not greater than those of the circumferential grooves 3. The auxiliary grooves 5 each, for example, has a groove width of not less than 0.5 mm and not greater than those of the circumferential grooves 3 (excluding the fourth circumferential groove 3D), and a groove depth of not greater than those of the circumferential grooves 3.

The auxiliary grooves 5 include a first auxiliary groove 5A, a second auxiliary groove 5B, a third auxiliary groove 5C, a fourth auxiliary groove 5D, and a fifth auxiliary groove 5E.

The first auxiliary groove 5A is formed so as to pass through the first circumferential groove 3A and communicate with the second circumferential groove 3B. More specifically, the first auxiliary groove 5A passes through the vehicle inner side third circumferential groove 3C as well, and thus is provided so as to pass through from the vehicle inner side shoulder land portion 4C, through the vehicle inner side middle land portion 4B, and to the center land portion 4A. That is, a first end of the first auxiliary groove 5A is disposed on a design end D on the vehicle inner side of a ground contact edge T, which is the vehicle inner side shoulder land portion 4C, and a second end communicates with the second circumferential groove 3B. Further, the first auxiliary groove 5A is formed so that the groove width gradually increases in the vehicle inner side direction away from the second circumferential groove 3B.

Here, the ground contact edges T are defined as two outermost edges of a ground contact region in the tire width direction. In FIG. 1, the ground contact edges T are depicted as continuous in the tire circumferential direction. The ground contact region is a region where the tread surface 2a of the tread portion 2 of the pneumatic tire 1 comes into contact with the road surface, with the pneumatic tire assembled on a regular rim, inflated to a regular inner pressure, and loaded with 70% of a regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The "regular internal pressure" refers to a "maximum air pressure" stipulated by JATMA, a maximum value in "tire load limits at various cold inflation pressures" stipulated by TRA, or "inflation pressures" stipulated by ETRTO. Note that "regular load" refers to a "maximum load capacity" defined by JATMA, a maximum value in "tire load limits at various cold inflation pressures" defined by TRA, and "load capacity" defined by ETRTO. Further, the design end D is defined as an outermost side end in the tire width direction of the tread portion 2, that is an outermost side end in the tire width direction where the auxiliary grooves 5 and the narrow grooves 6 are formed. In FIG. 1, the design end D is depicted as continuous in the tire circumferential direction.

The second auxiliary groove 5B is formed so as to communicate with the second circumferential groove 3B and bend continuously with respect to the first auxiliary groove 5A bounded by the second circumferential groove 3B. An embodiment in which the second auxiliary groove 5B and the first auxiliary groove 5A continue bounded by the second auxiliary groove 5B means that, when the first auxiliary groove 5A and the second auxiliary groove 5B extend within the second circumferential groove 3B, the extending lines intersect within the second circumferential groove 3B. More specifically, the second auxiliary groove 5B is provided so as to communicate with the third circumferential groove 3C disposed on the vehicle outer side of the second circumferential groove 3B, thereby passing through the vehicle outer side middle land portion 4B. That is, end portions of the second auxiliary groove 5B communicate with the second circumferential groove 3B and the third circumferential groove 3C in the middle land portion 4B. Further, the second auxiliary groove 5B is formed so that the groove width gradually increases in the vehicle outer side direction, away from the second circumferential groove 3B.

That is, the first auxiliary groove 5A and the second auxiliary groove 5B are formed continuously bounded by the second circumferential groove 3B, and are bent bounded by the second circumferential groove 3B. In FIG. 1, the first auxiliary groove 5A and the second auxiliary groove 5B are provided so as to incline in opposite directions with respect to the tire width direction and curve to opposite sides, and are both formed continuously into a V-shape with the second circumferential groove 3B positioned as a peak portion. Note that, while not illustrated, the first auxiliary groove 5A and the second auxiliary groove 5B may be provided so that one is formed along the tire width direction and the other is inclined with respect to the tire width direction.

The third auxiliary groove 5C is formed in the vehicle outer side shoulder land portion 4C so that an end portion is separated away from the third circumferential groove 3C on the outermost vehicle side. More specifically, a first end of the third auxiliary groove 5C is disposed on the design end D on the vehicle outer side of the ground contact edge T, in the vehicle outer side shoulder land portion 4C, and a second end terminates in the vehicle outer side shoulder land portion 4C, away from the vehicle outer side third circumferential groove 3C. Compared to the first auxiliary groove 5A, this third auxiliary groove 5C is provided so as to incline in the same direction with respect to the tire width direction and curve to the opposite side. Note that while the third auxiliary groove 5C is formed away from the vehicle outer side third circumferential groove 3C, a decorative groove 7 is interposed between the terminating second end and the third circumferential groove 3C. The decorative groove 7 is a groove formed with a groove width and a groove depth no greater than those of the third auxiliary groove 5C.

The fourth auxiliary groove 5D is provided in the center land portion 4A and the vehicle outer side middle land portion 4B so that both end portions passing through the second circumferential groove 3B terminate in both of the land portions 4A, 4B and are bent bounded by the second circumferential groove 3B. That is, the fourth auxiliary groove 5D includes a first end side that is formed in the center land portion 4A and, compared to the first auxiliary groove 5A, inclines in the same direction with respect to the tire width direction, and a second end side that is formed in the vehicle outer side middle land portion 4B and, compared to the second auxiliary groove 5B, inclines in the same direction with respect to the tire width direction and curves to the opposite side. Then, the fourth auxiliary groove 5D is provided so that the first end side and the second end side incline in opposite directions with respect to the tire width direction and are formed continuously bounded by the second circumferential groove 3B into a V-shape, with the second circumferential groove 3B positioned as a peak portion. Note that, while not illustrated, the first auxiliary groove 5A and the second auxiliary groove 5B may be provided so that one is formed along the tire width direction and the other is inclined in the tire width direction. Furthermore, while the fourth auxiliary groove 5D is formed away from the vehicle outer side third circumferential groove 3C, a narrow decorative groove 8 is interposed between the end portion on the terminating second end side and the third circumferential groove 3C. The narrow decorative groove 8 is formed with a groove width and a groove depth no greater than those of the fourth auxiliary groove 5D.

The fifth auxiliary groove 5E constitutes a section provided on the center land portion 4A side of the fourth auxiliary groove 5D. Details will be described later.

Further the narrow grooves 6 each includes a first narrow groove 6A, a second narrow groove 6B, and a third narrow groove 6C.

The first narrow groove 6A is provided between the first auxiliary grooves 5A in the tire circumferential direction, and extends from the vehicle inner side shoulder land portion 4C, through the vehicle inner side middle land portion 4B, and to the center land portion 4A. The first narrow groove 6A is formed in the vehicle inner side shoulder land portion 4C and in the vehicle inner side middle land portion 4B and, compared to the first auxiliary grooves 5A, inclines in the same direction with respect to the tire width direction and curves to the same side. A plurality (two in the present embodiment) of these first narrow grooves 6A are disposed as a set with each of first end portions linked at a position on the outer side in the tire width direction of the ground contact edge T in the vehicle inner side shoulder land portion 4C, and each of second end portions terminating in the center land portion 4A.

The second narrow groove 6B is provided between the third auxiliary grooves 5C in the tire circumferential direction, in the vehicle outer side shoulder land portion 4C. Compared to the third auxiliary grooves 5C, the second narrow groove 6B is formed so as to incline in the same direction with respect to the tire width direction and curve to the same side. A plurality (two in the present embodiment) of these second narrow grooves 6B are disposed as a set with each of first end portions communicating with the vehicle outer side third circumferential groove 3C, and each of second end portions linked at a position on the outer side in the tire width direction of the ground contact edge T.

The third narrow groove 6C constitutes a section provided on the center land portion 4A side of the first narrow groove 6A. Details will be described later.

Figure 2:
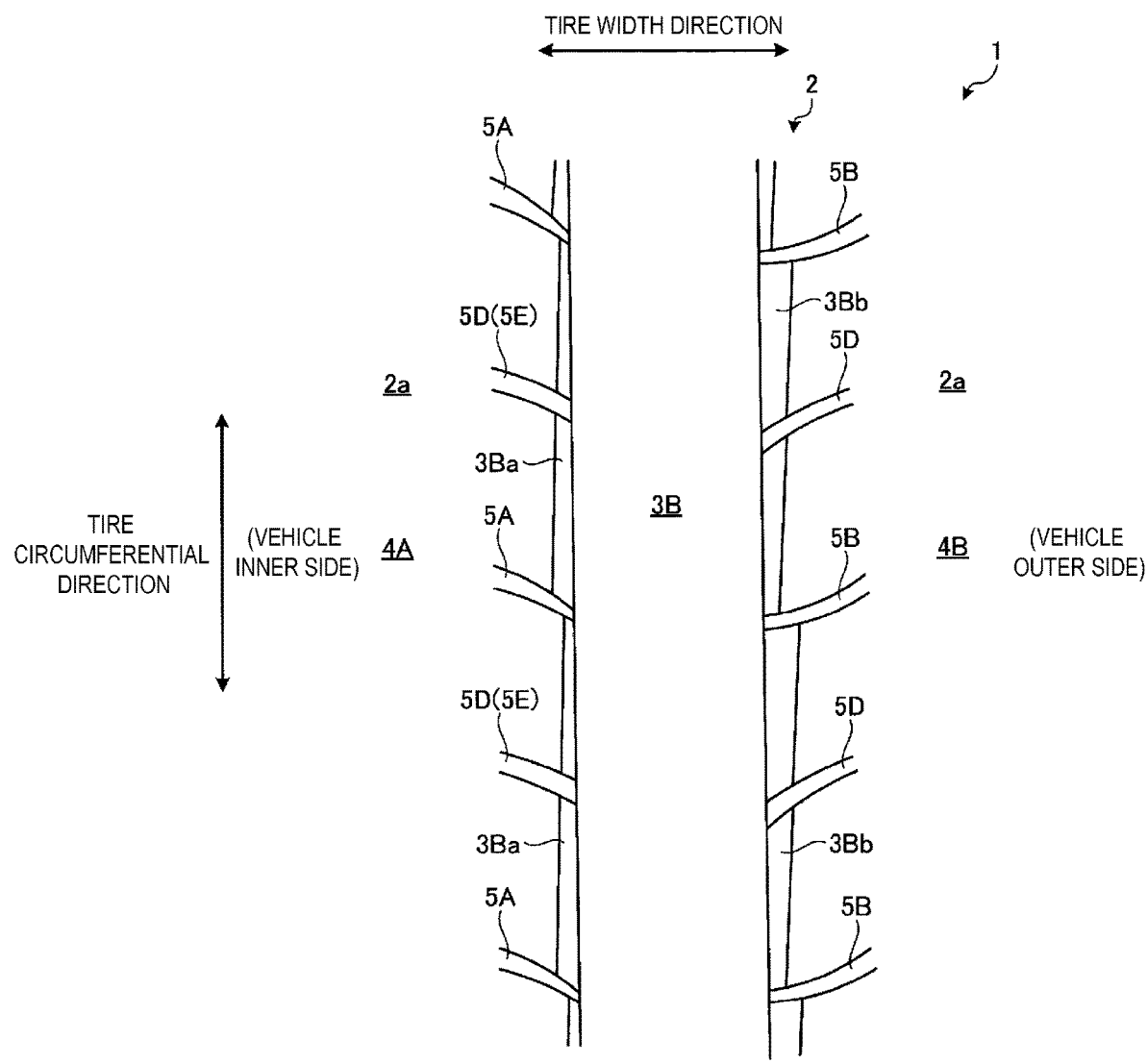
FIG. 2 is an enlarged plan view of a portion of the pneumatic tire according to an embodiment of the present technology.

FIG. 2 is an enlarged plan view of a portion of the pneumatic tire according to the present embodiment, near the second circumferential groove 3B.

As illustrated in FIG. 2, in the pneumatic tire 1 of the present embodiment, chamfers 3Ba, 3Bb are provided to the second circumferential groove 3B, on opening edges on both sides in the tire width direction. The chamfer 3Ba is provided to the opening edge of the second circumferential groove 3B on the center land portion 4A side, and is formed into an approximate triangular shape with the chamfer width gradually varying between the first auxiliary grooves 5A. Further, the chamfer 3Bb is provided to the opening edge of the second circumferential groove 3B on the vehicle outer side middle land portion 4B side, and is formed into an approximate triangular shape with the chamfer width gradually varying in the tire circumferential direction between the second auxiliary grooves 5B. Then, the chamfers 3Ba, 3Bb are disposed so that the approximate triangular shapes formed by the gradually varying chamfer widths are inverted at the opening edges on both sides of the second circumferential groove 3B. Note that, on the center land portion 4A side, the fourth auxiliary groove 5D (the fifth auxiliary grooves 5E) passes through a midway area of the chamfer 3Ba and communicates with the second circumferential groove 3B. Further, on the vehicle outer side middle land portion 4B side, the fourth auxiliary groove 5D passes through a midway area of the chamfer 3Bb and communicates with the second circumferential groove 3B. Furthermore, while not illustrated, the chamfers 3Ba, 3Bb may be formed so that the chamfer widths are parallel in the tire circumferential direction.

FIGS. 3 to 6 are each an enlarged plan view of a portion of the pneumatic tire according to the present embodiment, near the center land portion 4A.

Figure 3:
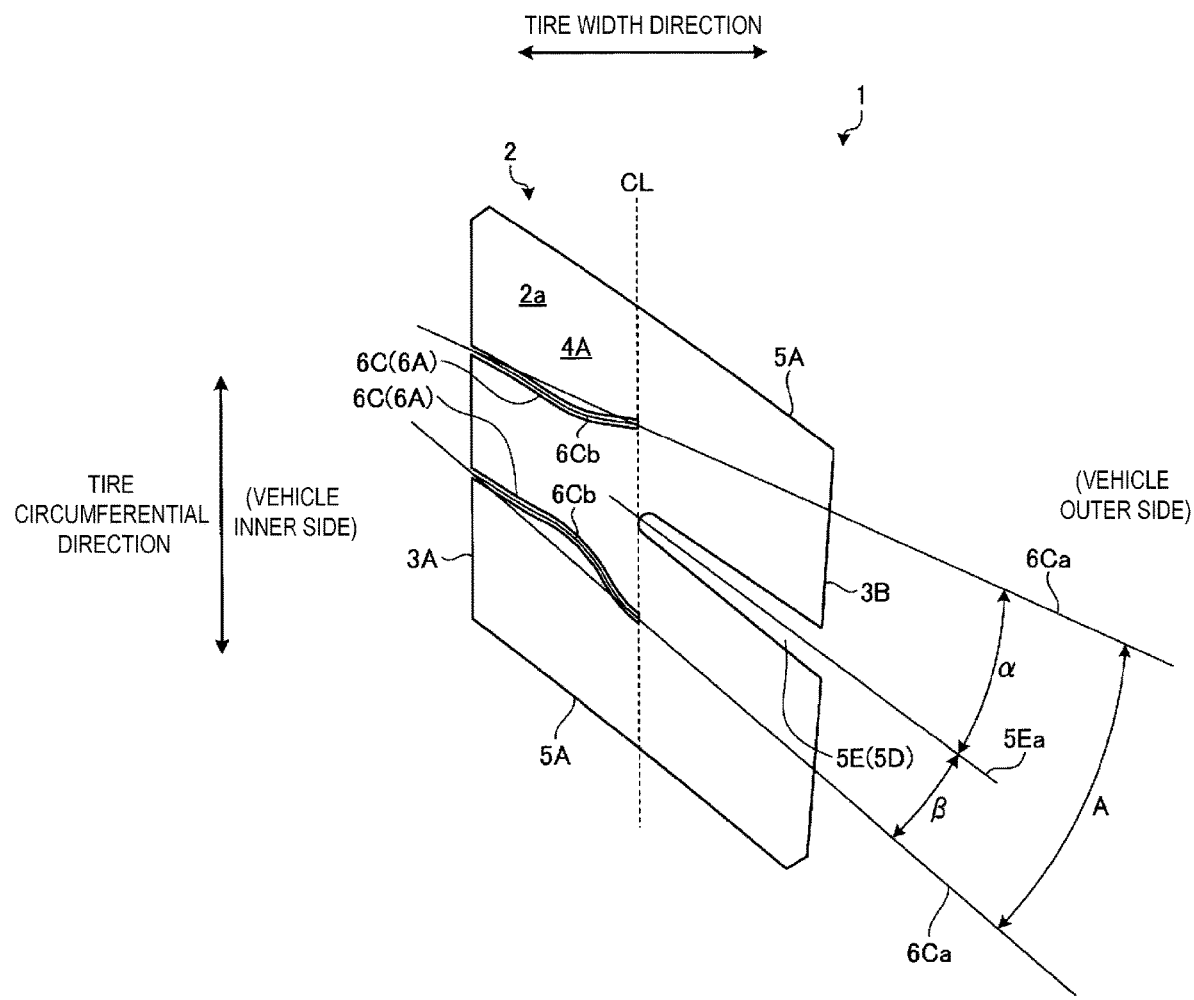
FIG. 3 is an enlarged plan view of a portion of the pneumatic tire according to the embodiment of the present technology.

As illustrated in FIG. 3, the center land portion 4A is formed into a block shape by the first circumferential groove 3A, the second circumferential groove 3B, and the first auxiliary grooves 5A. In this center land portion 4A, the third narrow groove 6C that forms one portion of the first narrow groove 6A, and the fifth auxiliary groove 5E that forms one portion of the fourth auxiliary groove 5D are formed on the tread surface 2a.

As illustrated in FIG. 3, the third narrow groove 6C is disposed intersecting the tire circumferential direction, and is formed so that a first end portion communicates with the first circumferential groove 3A and a second end portion terminates within the center land portion 4A. These third narrow grooves 6C are formed as sets of two grooves arranged side by side in the tire circumferential direction as a set.

Further, each of the sets of the third narrow grooves 6C is formed extending from the first end portions that communicate with the first circumferential groove 3A toward the second end portions that terminate within the center land portion 4A so as to spread in a mutual angle A in an angle range of from 10° to 50°, both inclusive. Here, as illustrated in FIG. 3, the third narrow grooves 6C are formed so as to curve. An extension direction of such a third narrow groove 6C is a straight line 6Ca that connects a center of the groove width of the first end portion that communicates with the first circumferential groove 3A, and a center of the groove width of the second end portion that terminates within the center land portion 4A. As a result, as illustrated in FIG. 3, the mutual angle A formed by the extending set of third narrow grooves 6C is designated as an angle of each straight line 6Ca formed in the extension direction of each of the third narrow grooves 6C.

Further, the third narrow grooves 6C are each formed on the basis of at least two different straight lines or curved lines that are continuous. That is, the third narrow grooves 6C, while not illustrated, include cases of being formed by bending and extending at least two continuous different straight lines in a zigzag manner, or curving and extending at least two continuous different curved lines into a wave shape. In this case as well, the straight line 6Ca that connects the center of the groove width of the first end portion that communicates with the first circumferential groove 3A, and the center of the groove width of the second end portion that terminates within the center land portion 4A is the extension direction of the third narrow grooves 6C. Note that a center line 6Cb that connects the centers of the groove width of the third narrow groove 6C in the extension direction is depicted in FIG. 3. This center line 6Cb serves as a reference line that reveals the curved shape or bent shape of the third narrow groove 6C in the extension direction. Further, each of the sets of third narrow grooves 6C may be formed so as to narrow or be parallel in the mutual extension directions from the first end portions that communicate with the first circumferential groove 3A to the second end portions that terminate within the center land portion 4A.

Figure 4:
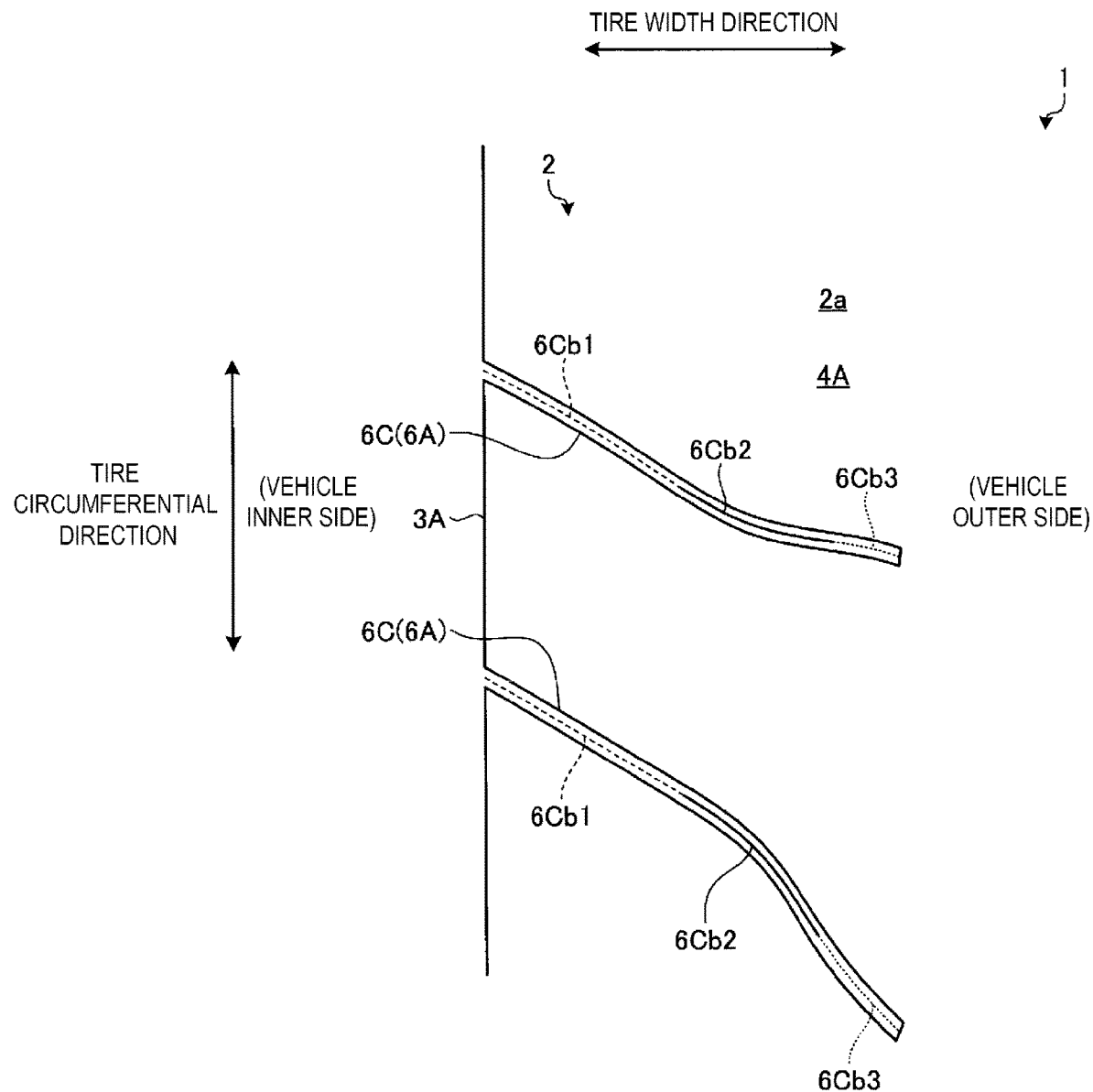
FIG. 4 is an enlarged plan view of a portion of the pneumatic tire according to the embodiment of the present technology.

As illustrated in FIG. 4, the third narrow grooves 6C in the present embodiment are each formed smoothly and continuously of three reference lines extending from the first end portion that communications with the first circumferential groove 3A toward the second end portion that terminates within the center land portion 4A, in the order of a first reference line 6Cb1 (indicated by a long dashed line), a second reference line 6Cb2 (indicated by the solid line), and a third reference line 6Cb3 (indicated by the short dashed line).

Figure 5:
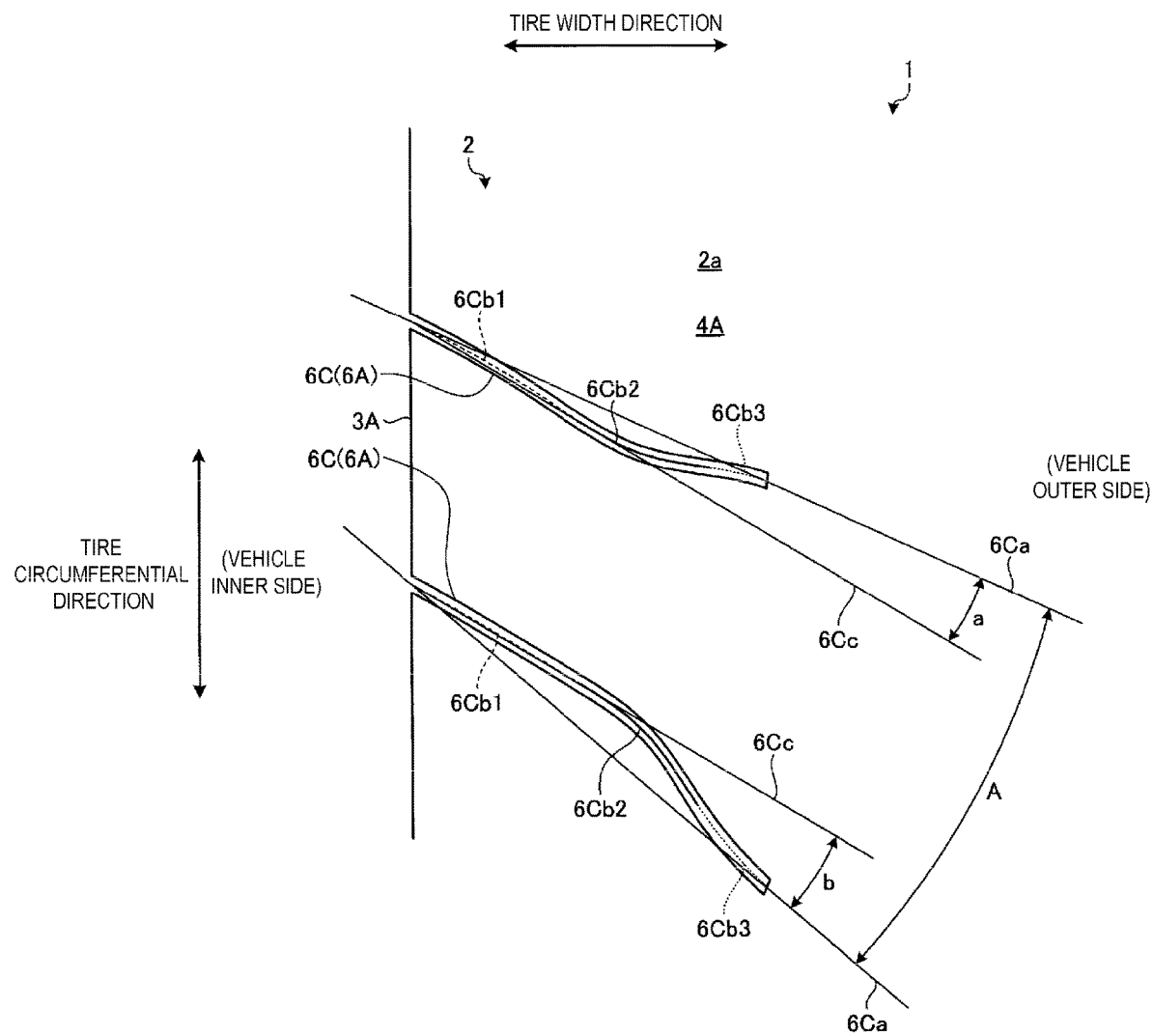
FIG. 5 is an enlarged plan view of a portion of the pneumatic tire according to the embodiment of the present technology.

Then, each of the sets of third narrow grooves 6C extends so that the first reference line 6Cb1 extending from the first end portion that communications with the first circumferential groove 3A curves toward the inner side with respect to each of the straight lines 6Ca that connects the first end portion communicating with the first circumferential groove 3A to the second end portion terminating within the center land portion 4A, as illustrated in FIG. 5. A straight line 6Cc that connects both ends of the first reference line 6Cb1 serves as an extension direction of the first reference line 6Cb1. This first reference line 6Cb1 is formed so that angles a, b formed by the straight line 6Cc serving as the extension direction of the first reference line 6Cb1 and the straight line 6Ca are in an angle range of from 5° to 20°, both inclusive.

Figure 6:
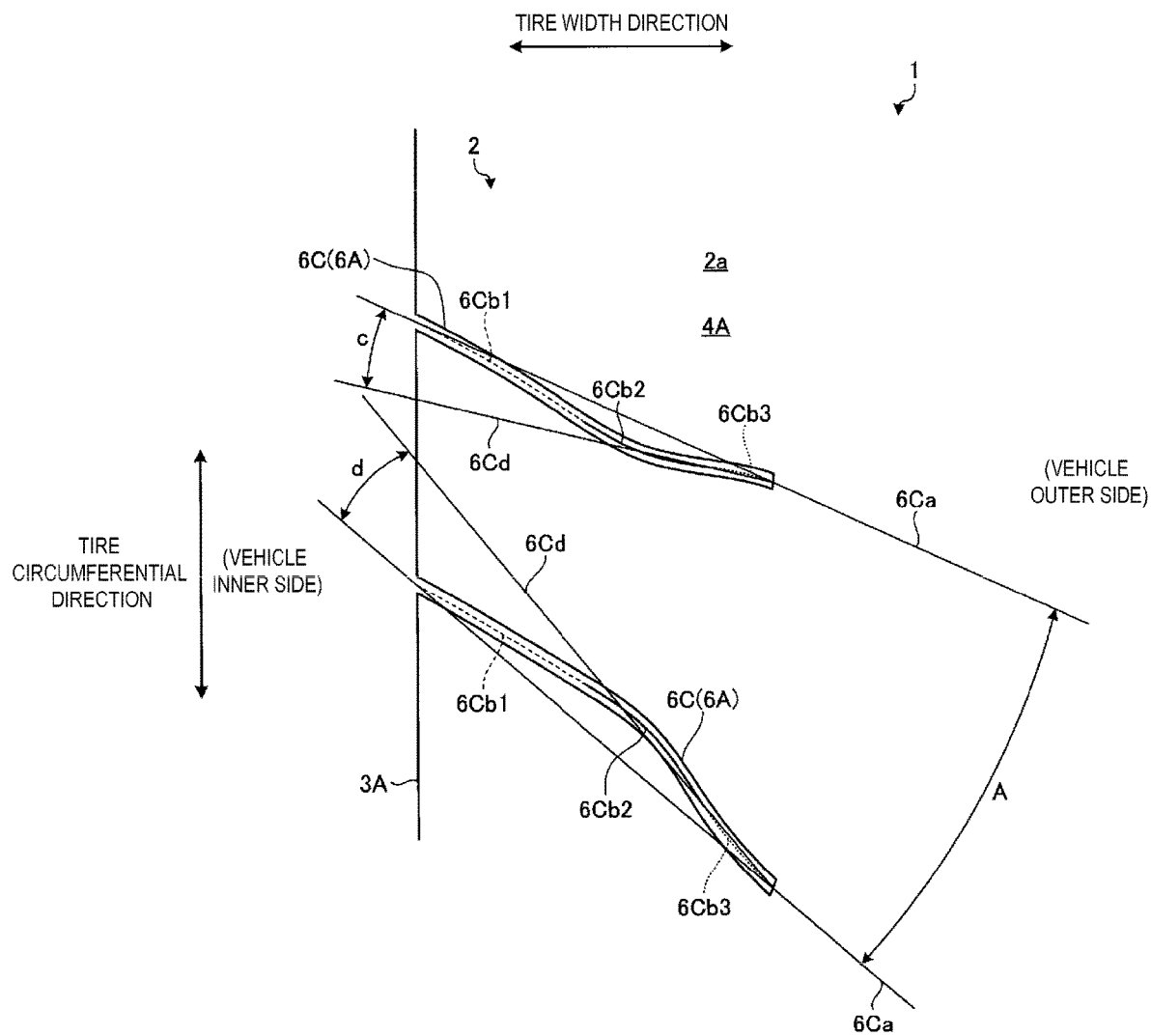
FIG. 6 is an enlarged plan view of a portion of the pneumatic tire according to the embodiment of the present technology.

Then, each of the sets of third narrow grooves 6C extends so that the third reference line 6Cb3 extending from the second end portion that terminates within the center land portion 4A curves toward the inner side with respect to each of the straight lines 6Ca that connects the first end portion communicating with the first circumferential groove 3A to the second end portion terminating within the center land portion 4A, as illustrated in FIG. 6. A straight line 6Cd that connects both ends of the third reference line 6Cb3 serves as an extension direction of the third reference line 6Cb3. This third reference line 6Cb3 is formed so that angles c, d formed by the straight line 6Cd serving as the extension direction of the third reference line 6Cb3 and the straight line 6Ca are in an angle range of from 5° to 20°, both inclusive.

Note that, as illustrated in FIGS. 4 to 6, the second reference line 6Cb2 of the third narrow groove 6C smoothly continues between and connects to the first reference line 6Cb1 and the third reference line 6Cb3. Note that while the second reference line 6Cb2 is illustrated as a curved line in the present embodiment, the second reference line 6Cb2 may be a straight line.

Returning to FIG. 3, the fifth narrow groove 5E is disposed intersecting the tire circumferential direction, and is formed so that a first end portion communicates with the second circumferential groove 3B and a second end portion terminates within the center land portion 4A. The terminating second end portion of the fifth auxiliary groove 5E is disposed between the terminating second end portions of each of the sets of third narrow grooves 6C in the tire circumferential direction. Further, the fifth auxiliary groove 5E is formed so that the groove width is gradually decreasing from the first end portion that communicates with the second circumferential groove 3B toward the second end portion that terminates within the center land portion 4A.

Note that while, in the embodiment where the terminating second end portion of the fifth auxiliary groove 5E is disposed between the terminating second end portions of each of the sets of third narrow grooves 6C in the tire circumferential direction, each of the second end portions is depicted in FIG. 3 as reaching the tire equatorial plane CL, the embodiment is not limited thereto. For example, while not illustrated, at least one of the second end portions may extend beyond the tire equatorial plane CL or may not go beyond the tire equatorial plane CL.

The fifth auxiliary groove 5E is formed so that an angle α formed by an extension direction from the first end portion that communicates with the second circumferential groove 3B toward the second end portion that terminates within the center land portion 4A, and an extension direction of one of each of the sets of third narrow grooves 6C is in an angle range of from 10° to 30°, both inclusive. Further, the fifth auxiliary groove 5E is formed so that an angle β formed by the extension direction from the first end portion that communicates with the second circumferential groove 3B toward the second end portion that terminates within the center land portion 4A, and an extension direction of the other of each of the sets of third narrow grooves 6C is in an angle range of from 1° to 20°, both inclusive. Then, the fifth auxiliary groove 5E is formed so that a total of the angle α and the angle β is within the range of the angle A previously described. An extension direction of the fifth narrow groove 5E is a straight line 5Ea that connects a center of the groove width of the first end portion that communicates with the second circumferential groove 3B, and a center of the groove width of the second end portion that terminates within the center land portion 4A, as illustrated in FIG. 3. As a result, as illustrated in FIG. 3, the angle α formed by the extension direction of the fifth auxiliary groove 5E and the extension direction of one of each of the sets of narrow grooves 6C is designated as an angle formed by the straight line 5Ea and the straight line 6Ca of the one third narrow groove 6C. Further, as illustrated in FIG. 3, the angle β formed by the extension direction of the fifth auxiliary groove 5E and the extension direction of the other of each of the sets of narrow grooves 6C is designated as an angle formed by the straight line 5Ea and the straight line 6Ca of the other third narrow groove 6C.

As described above, the pneumatic tire 1 of the present embodiment includes the first circumferential groove 3A and the second circumferential groove 3B that are provided on the tread surface 2a of the tread portion 2 and extend along the tire circumferential direction while being arranged side by side in the tire width direction interposing the tire equatorial plane CL therebetween, the plurality of first auxiliary grooves 5A that are formed in the tire circumferential direction, disposed intersecting the tire circumferential direction, and communicate with the second circumferential groove 3B by passing through the first circumferential groove 3A, and the plurality of second auxiliary grooves 5B that are formed in the tire circumferential direction, disposed intersecting the tire circumferential direction so as to incline in the tire width direction, communicate with the second circumferential groove 3B, and bend continuously with respect to the first auxiliary groove 5A bounded by the second circumferential groove 3B.

According to this pneumatic tire 1, the first auxiliary grooves 5A and the second auxiliary grooves 5B communicating with the second circumferential groove 3B are bent bounded by the second circumferential groove 3B, thereby causing at least one of the auxiliary grooves to incline in the tire width direction and thus improving a rigidity of the defined land portions. Moreover, the first auxiliary grooves 5A and the second auxiliary grooves 5B that communicate with the second circumferential groove 3B are continuously bent bounded by the second circumferential groove 3B, thereby improving the water drainage performance in the tire width direction. Moreover, the first auxiliary grooves 5A pass through the first circumferential groove 3A arranged side by side with the second circumferential groove 3B, thereby causing the land portion between the first circumferential groove 3A and the second circumferential groove 3B to be formed into a block shape and thus improving the edge effect. As a result, the braking performance on a dry road surface is enhanced by the improvement in rigidity of the land portion, the braking performance on a wet road surface is enhanced by the improvement in water drainage performance, and the braking performance on a snow-covered road surface is enhanced by the edge effect.

Moreover, the first auxiliary grooves 5A are formed so as to curve, thereby further improving the edge effect and thus making it possible to enhance the improvement effect of the braking performance on a snow-covered road surface.

Further, the pneumatic tire 1 of the present embodiment further includes the third circumferential grooves 3C that extend along the tire circumferential direction on the vehicle inner side of the first circumferential groove 3A and a vehicle outer side of the second circumferential groove 3B, respectively, the vehicle inner side and the vehicle outer side being designated when the tire is to be mounted to a vehicle, the first circumferential groove 3A being disposed on the vehicle inner side, and the second circumferential groove 3B being disposed on the vehicle outer side. Each of the circumferential grooves 3A, 3B, 3C defines the center land portion 4A on the tire equatorial plane CL, each of the vehicle outer side middle land portions 4B in the tire width direction of the center land portion 4A, and the vehicle inner side shoulder land portion 4C in the tire width direction of each of the middle land portions 4B. The second circumferential groove 3B is formed with a narrower width than that of the other circumferential grooves 3A, 3C, and the first auxiliary grooves 5A are each provided so as to pass through the third circumferential groove 3C disposed on the vehicle inner side of the first circumferential groove 3A, thereby passing through the vehicle inner side shoulder land portion 4C, the vehicle inner side middle land portion 4B, and the center land portion 4A. The second auxiliary grooves 5B are each provided so as to communicate with the third circumferential groove 3C disposed on the vehicle outer side of the second circumferential groove 3B, thereby passing through the vehicle outer side middle land portion 4B.

According to this pneumatic tire 1, the second circumferential groove 3B is disposed on the vehicle outer side of the center land portion 4A on the tire equatorial plane CL and is formed with a narrower width than that of the other circumferential grooves 3A, 3C, thereby increasing the dimensions in the tire width direction of the shoulder land portion 4C and the vehicle outer side middle land portion 4B that contributes to braking performance on a dry road surface, and thus improving the rigidity of the land portions. Moreover, on the vehicle inner side that contributes to braking performance on a wet road surface and a snow-covered road surface, the first auxiliary grooves 5A pass through the shoulder land portion 4C, the middle land portion 4B, and the center land portion 4A, thereby improving water drainage properties. Furthermore, the land portions on the vehicle inner side are formed into block shapes, improving the edge effect. This makes it possible to enhance the improvement effect of the braking performance on a dry road surface, a wet road surface, and a snow-covered road surface.

Further, the pneumatic tire 1 according to the present embodiment further includes the first narrow groove 6A provided so as to extend from the vehicle inner side shoulder land portion 4C, through the vehicle inner side middle land portion 4B, and to the center land portion 4A. This first narrow groove 6A is formed with a narrower groove width than that of the first auxiliary groove 5A.

According to this pneumatic tire 1, the first narrow groove 6A is provided, thereby improving the edge effect and making it possible to enhance the improvement effect of the braking performance on a snow-covered road surface.

Moreover, the first narrow groove 6A is formed so as to curve, thereby further improving the edge effect and thus making it possible to enhance the improvement effect of the braking performance on a snow-covered road surface.

Further, in the pneumatic tire according to the present embodiment, a plurality of the first narrow grooves 6A are disposed as sets of a plurality of grooves arranged side by side in the tire circumferential direction. Each of the first narrow grooves includes the first end portion and the second end portion. The respective first end portions are linked in the vehicle inner side shoulder land portion, and the respective second end portions terminate in the center land portion.

According to this pneumatic tire 1, the edge effect is further improved and it is possible to enhance the improvement effect of the braking performance on a snow-covered road surface. Moreover, the plurality of first narrow grooves 6A are disposed as sets of a plurality of grooves arranged side by side in the tire circumferential direction, and the respective first end portions are linked in the vehicle inner side shoulder land portion 4C, thereby improving the water drainage properties and thus making it possible to enhance the improvement effect of the braking performance on a wet road surface.

Further, the pneumatic tire 1 according to the present embodiment further includes the fourth circumferential groove 3D that extends in a zigzag manner along the tire circumferential direction in the vehicle inner side middle land portion 4B, and is formed with a narrower groove width than those of the other circumferential grooves 3A, 3B, 3C.

According to this pneumatic tire 1, the zigzag shape prevents collapse of the vehicle inner side middle land portion 4B in the tire width direction and improves the rigidity of the middle land portion 4B, thereby making it possible to enhance the effect of improving the braking performance on a dry road surface. Moreover, the zigzag shape makes it possible to improve the edge effect and enhance the improvement effect of the braking performance on a snow-covered road surface.

Further, the pneumatic tire 1 according to the present embodiment further includes the plurality of third auxiliary grooves 5C that are formed in the vehicle outer side shoulder land portion 4C, arranged side by side in the tire circumferential direction, and disposed intersecting the tire circumferential direction. Each of these third auxiliary grooves 5C includes an end portion formed away from the vehicle outer side third circumferential groove 3C.

According to this pneumatic tire 1, the edge effect of each of the third auxiliary grooves 5C makes it possible to enhance the improvement effect of the braking performance on a snow-covered road surface. Moreover, the end portion of each of the third auxiliary grooves 5C is formed away from the vehicle outer side third circumferential groove 3C, thereby improving the rigidity of the vehicle outer side shoulder land portion 4C and thus making it possible to enhance the effect of improving the braking performance on a dry road surface.

Further, the pneumatic tire 1 of the present embodiment further includes the plurality of fourth auxiliary grooves 5D that are formed in the center land portion 4A and the vehicle outer side middle land portion 4B, arranged side by side in the tire circumferential direction, and disposed intersecting the tire circumferential direction. Each of these fourth auxiliary grooves 5D includes two end portions that pass through the second circumferential groove 3B, terminate in both of the land portions 4A, 4B, and are bent bounded by the second circumferential groove 3B.

According to this pneumatic tire 1, the end portions of the fourth auxiliary grooves 5D terminate in both of the land portions 4A, 4B, thereby improving the rigidity of each of the land portion 4A, 4B and thus making it possible to enhance the effect of improving the braking performance on a dry road surface. Moreover, the fourth auxiliary grooves 5D are bent bounded by the second circumferential groove 3B, thereby improving the water drainage performance in the tire width direction and thus making it possible to enhance the improvement effect of the braking performance on a wet road surface. Moreover, the fourth auxiliary grooves 5D are bent bounded by the second circumferential groove 3B, thereby improving the edge effect and thus making it possible to enhance the improvement effect of the braking performance on a snow-covered road surface.

Further, the pneumatic tire 1 according to the present embodiment further includes the plurality of second narrow grooves 6B that are provided in the vehicle outer side shoulder land portion 4C, disposed as sets of a plurality of grooves arranged side by side in the tire circumferential direction, and disposed intersecting the tire circumferential direction. Each of these second narrow grooves 6B includes a first end portion and a second end portion. The respective first end portions communicate with the vehicle outer side third circumferential groove 3C, and the respective second end portions are linked.

According to this pneumatic tire 1, the second narrow grooves 6B are provided, thereby improving the edge effect and making it possible to enhance the improvement effect of the braking performance on a snow-covered road surface. Moreover, the plurality of second narrow grooves 6B are disposed as sets of a plurality of grooves arranged side by side in the tire circumferential direction, thereby further improving the edge effect and making it possible to enhance the improvement effect of the braking performance on a snow-covered road surface. Moreover, the plurality of second narrow grooves 6B are disposed as sets of a plurality of grooves arranged side by side in the tire circumferential direction, and the respective second end portions are linked in the vehicle outer side shoulder land portion 4C, thereby improving the water drainage properties and thus making it possible to enhance the improvement effect of the braking performance on a wet road surface.

Furthermore, the second narrow grooves 6B are formed so as to curve, thereby further improving the edge effect and thus making it possible to enhance the improvement effect of the braking performance on a snow-covered road surface.

Further, in the pneumatic tire 1 according to the present embodiment, the first auxiliary grooves 5A are each formed so that the groove width gradually increases in the direction away from the second auxiliary groove 5B, and the second auxiliary grooves 5B are each formed so that the groove width gradually increases in the direction away from the first auxiliary groove 5A.

According to this pneumatic tire 1, the water drainage properties are improved, making it possible to enhance the improvement effect of the braking performance on a wet road surface.

Further, in the pneumatic tire 1 according to the present embodiment, the chamfers 3Ba, 3Bb are provided to the second circumferential groove 3B, on opening edges on both sides in the tire width direction.

According to this pneumatic tire 1, the chamfers 3Ba, 3Bb improve the edge effect, making it possible to enhance the improvement effect of the braking performance on a snow-covered road surface.

Further, in the pneumatic tire 1 according to the present embodiment, the chamfers 3Ba, 3Bb are each formed so as to have a chamfer width that gradually varies in the tire circumferential direction between each of the first auxiliary grooves 5A and between each of the second auxiliary grooves 5B, and are disposed so as to be inverted at the opening edges on both sides of the second circumferential groove 3B.

According to this pneumatic tire 1, the chamfers 3Ba, 3Bb are alternately formed inverted on the opening edges of both sides of the second circumferential groove 3B, thereby improving snow discharge properties and thus making it possible to enhance the improvement effect of the braking performance on a snow-covered road surface.

Furthermore, the second circumferential groove 3B is formed with a narrower groove width than those of the first circumferential groove 3A and the third circumferential groove 3C, thereby further improving snow discharge properties resulting from the chamfers 3Ba, 3Bb, and thus making it possible to enhance the improvement effect of the braking performance on a snow-covered road surface.

Further, the pneumatic tire 1 according to the present embodiment further includes a plurality of third narrow grooves 6C and the fifth auxiliary groove 5E in the land portion (center land portion 4A) defined by the first circumferential groove 3A and the second circumferential groove 3B. The third narrow grooves 6C are disposed as sets of two grooves arranged side by side in the tire circumferential direction, disposed intersecting the tire circumferential direction, communicate with the first circumferential groove 3A, and terminate within the center land portion 4A. The fifth auxiliary groove 5E is disposed intersecting the tire circumferential direction, communicates with the second circumferential groove 3B, and terminates within the center land portion 4A. The terminating end portion of the fifth auxiliary groove 5E is disposed between the terminating end portions of each of the sets of third narrow grooves 6C in the tire circumferential direction.

According to this pneumatic tire 1, the fifth auxiliary groove 5E improves the water drainage properties, making it possible to enhance the improvement effect of the braking performance on a wet road surface. Moreover, the third narrow grooves 6C improve the edge effect, making it possible to enhance the improvement effect of the braking performance on a snow-covered road surface. Moreover, the third narrow grooves 6C and the fifth auxiliary groove 5E terminate within the center land portion 4A, and the position of the terminating end portion of the fifth auxiliary groove 5E is disposed between the terminating end portions of each of the sets of third narrow grooves 6C in the tire circumferential direction, thereby improving the rigidity of the land portion and making it possible to enhance the effect of improving the braking performance on a dry road surface.

Further, in the pneumatic tire 1 according to the present embodiment, the second circumferential groove 3B is formed with a narrower groove width than that of the first circumferential groove 3A, and the third narrow grooves 6C are formed with a narrower groove width than that of the fifth auxiliary groove 5E.

According to this pneumatic tire 1, the groove width of the second circumferential groove 3B is made narrower, making it possible to improve the rigidity of the land portions (the center land portion 4A and the vehicle outer side middle land portion 4B) on both sides. Yet, water drainage properties tend to deteriorate. Compensation for this deterioration in water drainage properties can then be made by the fifth auxiliary groove 5E having a wide groove width. Further, the third narrow grooves 6C that communicate with the first circumferential groove 3A having a wide groove width are each formed with a narrower groove width than that of the fifth auxiliary groove 5E, making it possible to achieve a rigidity balance in the land portion (center land portion 4A) between the first circumferential groove 3A and the second circumferential groove 3B and suppress uneven wear.

Further, in the pneumatic tire 1 according to the present embodiment, each of the sets of two third narrow grooves 6C is formed so as to spread in an angle A in an angle range of from 10° to 50°, both inclusive, from the communicating end portions toward the terminating end portions. Further, the fifth auxiliary groove 5E is formed extending so as to spread in an angle α in an angle range of from 9° to 30°, both inclusive, with respect to one of each of the sets of two third narrow grooves 6C, and in an angle β in an angle range of from 1° to 20°, both inclusive, with respect to the other of each of the sets of two third narrow grooves 6C, from the terminating end portion toward the communicating end portion.

According to this pneumatic tire 1, each of the sets of two third narrow grooves 6C is formed extending so as to spread, separating from the fifth auxiliary groove 5E, thereby making it possible to suppress a decrease in block rigidity and enhance the improvement effect of the braking performance on a snow-covered road surface by the edge effect of the third narrow grooves 6C.

Here, when the opening angle A of each of the sets of two third narrow grooves 6C is less than 10°, the third narrow grooves 6C come close to being parallel, making it difficult to suppress a decrease in land portion rigidity. On the other hand, when the opening angle A of each of the sets of two third narrow grooves 6C exceeds 50°, the third narrow grooves 6C come close to being in the tire circumferential direction, making it difficult to achieve the edge effect. As a result, each of the sets of two third narrow grooves 6C is preferably formed extending so as to spread in the range of the angle A of from 10° to 50°, both inclusive, from the communicating end portions to the terminating end portions. Further, when the angle α between the fifth auxiliary groove 5E and one of the third narrow grooves 6C is less than 9°, the fifth auxiliary groove 5E and the one third narrow groove 6C come close to being parallel, making it difficult to suppress a decrease in block rigidity. On the other hand, when the angle α between the fifth auxiliary groove 5E and the one third narrow groove 6C exceeds 30°, the angle β between the fifth auxiliary groove 5E and the other third narrow groove 6C comes close to parallel, making it difficult to suppress a decrease in land portion rigidity. Further, when the angle β between the fifth auxiliary groove 5E and the other third narrow groove 6C is less than 1°, the fifth auxiliary groove 5E and the other third narrow groove 6C come close to being parallel, making it difficult to suppress a decrease in land portion rigidity. On the other hand, when the angle β between the fifth auxiliary groove 5E and the other third narrow groove 6C exceeds 20°, the angle α between the fifth auxiliary groove 5E and the one third narrow groove 6C comes close to parallel, making it difficult to suppress a decrease in land portion rigidity. As a result, the fifth auxiliary groove 5E is preferably formed extending in an angle α in a range of from 9° to 30°, both inclusive, with respect to the one of each of the sets of two third narrow grooves 6C, and in an angle β in the range of from 1° to 20°, both inclusive, with respect to the other of each of the sets of two third narrow grooves 6C, from the terminating end portion toward the communicating end portion.

Further, in the pneumatic tire 1 of the present embodiment, the third narrow grooves 6C are each formed on the basis of at least two different straight lines or curved lines that are continuous.

According to this pneumatic tire 1, the third narrow grooves 6E are each formed on the basis of at least two different straight lines or curved lines that are continuous, thereby improving the edge effect achieved by the third narrow grooves 6C and thus making it possible to enhance the improvement effect of the braking performance on a snow-covered road surface.

Further, in the pneumatic tire 1 according to the present embodiment, the third narrow grooves 6C are each formed smoothly and continuously of three reference lines in the order of the first reference line 6Cb1, the second reference line 6Cb2, and the third reference line 6Cb3, from the communicating end portion toward the terminating end portion.

According to this pneumatic tire 1, the third narrow grooves 6C are each formed smoothly and continuously of the three reference lines 6Cb1, 6Cb2, 6Cb3 in order, thereby making it possible to suppress collapse of the land portion (center land portion 4A) and enhance the effect of improving the braking performance on a dry road surface. Moreover, the third narrow grooves 6C are each formed smoothly and continuously of the reference lines 6Cb1, 6Cb2, 6Cb3, thereby making it possible to improve the strength of the third narrow groove 6C itself, achieve favorable grip properties, and enhance the effect of improving the braking performance on a dry road surface.

Further, in the pneumatic tire 1 according to the present embodiment, each of the sets of third narrow grooves 6C is formed so that, with respect to each straight line 6Ca connecting the communicating end portion to the terminating end portion, each of the first reference lines 6Cb1 that extends from the communicating end portion extends toward an inner side, and the first reference line 6Cb1 and the straight line 6Ca are formed in an angle range of from 5° to 20°, both inclusive.

When the first reference line 6Cb1 that extends from the communicating end portion is less than 5° with respect to the straight line 6Ca connecting the communicating end portion to the terminating end portion, that is, with respect to the overall extension direction of the third narrow groove 6C, the third narrow groove 6C comes close to being a straight line, making it difficult to achieve an action that suppresses collapse of the land portion (center land portion 4A). On the other hand, when the first reference line 6Cb1 and the straight line 6Ca exceed 20°, the third narrow groove 6C significantly deviates from the overall extension direction, making it difficult to improve the strength of the third narrow groove 6C itself and achieve an action that makes the grip properties favorable. As a result, the first reference line 6Cb1 of the third narrow groove 6C and the straight line 6Ca are formed in an angle range of from 5° to 20°, both inclusive, thereby making it possible to suppress collapse of the land portion (center land portion 4A) and better enhance the effect of improving the braking performance on a dry road surface, and making it possible to improve the strength of the third narrow groove 6C itself and better enhance the effect of improving the braking performance on a dry road surface.

Further, in the pneumatic tire 1 according to the present embodiment, each of the sets of third narrow grooves 6C is formed so that, with respect to each straight line 6Ca connecting the communicating end portion to the terminating end portion, each of the third reference lines 6Cb3 that extends from the terminating end portion extends toward an inner side, and the third reference line 6Cb3 and the straight line 6Ca are formed in an angle range of from 5° to 20°, both inclusive.

When the third reference line 6Cb3 that extends from the terminating end portion is less than 5° with respect to the straight line 6Ca connecting the communicating end portion to the terminating end portion, that is, with respect to the overall extension direction of the third narrow groove 6C, the third narrow groove 6C comes close to being a straight line, making it difficult to achieve an action that suppresses collapse of the land portion (center land portion 4A). On the other hand, when the third reference line 6Cb3 and the straight line 6Ca exceed 20°, the third narrow groove 6C significantly deviates from the overall extension direction, making it difficult to improve the strength of the third narrow groove 6C itself and achieve an action that makes the grip properties favorable. As a result, the third reference line 6Cb3 of the third narrow groove 6C and the straight line 6Ca are formed in an angle range of from 5° to 20°, both inclusive, thereby making it possible to suppress collapse of the land portion (center land portion 4A) and better enhance the effect of improving the braking performance on a dry road surface, and making it possible to improve the strength of the third narrow groove 6C itself and better enhance the effect of improving the braking performance on a dry road surface.

Further, in the pneumatic tire 1 according to the present embodiment, the fifth auxiliary groove 5E is formed so that the groove width is gradually decreasing from the communicating end portion toward the terminating end portion.

According to this pneumatic tire 1, the fifth auxiliary groove 5E is formed so that the tip is increasingly narrower toward the land portion (center land portion 4A) interior, thereby maintaining a ground contact surface area of the land portion, and making it possible to enhance the effect of improving the braking performance on a dry road surface.

Further, in the pneumatic tire 1 according to the present embodiment, the land portion where the third narrow grooves 6C and the fifth auxiliary groove 5E are provided is the center land portion 4A disposed on the tire equatorial plane CL.

According to this pneumatic tire 1, the center land portion 4A is the land portion that contacts the road surface the most, making it possible to retain the braking performance on a dry road surface. Further, the land portion that improves the braking performance on a snow-covered road surface is disposed on the tire equatorial plane CL, making it possible to remarkably achieve these effects.

Further, in the pneumatic tire 1 of the present embodiment, the groove depth of the narrow grooves 6A, 6B, 6C is formed so as to be in the range of from 0.4 mm to 1.2 mm, both inclusive.

According to this pneumatic tire 1, each of the narrow grooves 6A, 6B, 6C is configured as a so-called sipe, thereby improving the edge effect and making it possible to enhance the improvement effect of the braking performance on a snow-covered road surface.

EXAMPLES

In these working examples, a variety of test tires under different conditions were used in performance testing pertaining to braking performance on a wet road surface, braking performance on a snow-covered road surface, and braking performance on a dry road surface (see FIGS. 7A through 8C).

In this performance testing, a pneumatic tire having a tire size of 205/55R16 was assembled on a regular 16×6.5JJ rim, inflated to the regular inner pressure (200 kPa), and mounted on a test vehicle (1600 cc front engine, front drive vehicle).

The braking performance on a wet road surface was evaluated by measuring a braking distance of the above-described test vehicle from a speed of 100 km/h on a test course having a wet road surface with a water depth of 1 mm. Evaluations were performed by indexing the measurement results with Conventional Examples 1 and 2 as the standard score (100). In this evaluation, a larger value indicates preferable performance.

The braking performance on a snow-covered road surface was evaluated by measuring a braking distance with ABS braking of the above-described test vehicle from a speed of 40 km/h on a test course having a compact snow-covered road surface. Evaluations were performed by indexing the measurement results with Conventional Examples 1 and 2 as the standard score (100). In this evaluation, a larger value indicates preferable performance.

The braking performance on a dry road surface was evaluated by measuring a braking distance of the above-described test vehicle from a speed of 100 km/h on a test course having a dry road surface. Evaluations were performed by indexing the measurement results with Conventional Examples 1 and 2 as the standard score (100). In this evaluation, a larger value indicates preferable performance.

In FIGS. 7A through 8C, a pneumatic tire serving as the test tire includes five land portions formed by four circumferential grooves on a tread surface. The land portions include a center land portion arranged on a tire equatorial plane, a middle land portion arranged on each of two outer sides of the center land portion and neighboring the center land portion in the tire width direction, and a shoulder land portion arranged neighboring the middle land portion on the outer side of each of the middle land portions in the tire width direction.

In the pneumatic tire of Conventional Example 1 indicated in FIGS. 7A-7C, first auxiliary grooves and second auxiliary grooves are formed in a linear manner along the tire width direction, and are formed continuously bounded by the second circumferential groove. Further, in the pneumatic tire of Comparative Example 1, first auxiliary grooves and second auxiliary grooves are formed in a linear manner in the tire width direction, and are not formed continuously bounded by the second circumferential groove.

On the other hand, in the pneumatic tires of Working Examples 1 to 16 indicated in FIGS. 7A-7C, at least one of first auxiliary grooves and the second auxiliary grooves are formed inclined with respect to the tire width direction, and bend continuously bounded by the second circumferential groove. Note that, when the first auxiliary grooves and the second auxiliary grooves incline with respect to the tire width direction, a V-shape is formed.

Further, in the pneumatic tires of the Working Examples 4 to 16, the vehicle inner side and the vehicle outer side are designated when the pneumatic tire is mounted onto the vehicle, the second circumferential groove is formed with a narrower groove width than that of the other circumferential grooves, and each of the first auxiliary grooves passes through the third circumferential groove disposed on the vehicle inner side of the first circumferential groove, thereby passing through a vehicle inner side shoulder land portion, a vehicle inner side middle land portion, and a center land portion. Further, the second auxiliary grooves communicate with the third circumferential groove disposed on the vehicle outer side of the second circumferential groove, thereby passing through the vehicle outer side middle land portion.

Further, in the pneumatic tires of the Working Examples 5 to 16, a first narrow groove is provided so as to pass through from the vehicle inner side shoulder land portion to the center land portion.

Further, in the pneumatic tires of the Working Examples 6 to 16, two of the first narrow grooves form a set, respective first end portions thereof linked in the vehicle inner side shoulder land portion, and respective second end portions thereof terminate in the center land portion.

Further, in the pneumatic tires of the Working Examples 7 to 16, a fourth circumferential groove having a zigzag shape is provided in the vehicle inner side middle land portion.

Further, in the pneumatic tires of the Working Examples 8 to 16, a third auxiliary groove is provided in a non-communicating manner in the vehicle outer side shoulder land portion, with an end portion separated from the vehicle outer side third circumferential groove.

Further, in the pneumatic tires of the Working Examples 9 to 16, a fourth auxiliary groove is provided so as to be bent bounded by the vehicle outer side third circumferential groove.

Further, in the pneumatic tires of the Working Examples 10 to 16, two second narrow grooves are provided as a set in the vehicle outer side shoulder land portion, with the respective first end portions communicating with the vehicle outer side third circumferential groove, and the respective second end portions linked.

Further, in the pneumatic tires of the Working Example 11 to 16, the first auxiliary grooves and the second auxiliary grooves are formed so as to gradually increase in groove width toward the outer side in the tire width direction.

Further, in the pneumatic tires of the Working Example 12 to 16, a chamfer is provided and, in the pneumatic tires of the Working Example 13 to 16, a triangular shaped chamfer is provided in an inverted manner.

Further, in the pneumatic tires of Working Examples 14 to 16, a groove width of the narrow groove is formed so as to be within a designated range of from 0.4 mm to 1.2 mm, both inclusive.

In the pneumatic tire of Conventional Example 2 indicated in FIGS. 8A-8C, a third narrow groove and a fifth auxiliary groove are provided in any one of the middle land portions in an embodiment in which the first auxiliary grooves and the second auxiliary grooves incline with respect to the tire width direction and form a V shape. The third narrow groove communicates with one circumferential groove and terminates in the center of the middle land portion. The fifth auxiliary groove communicates with the other circumferential groove and terminates in the center of the middle land portion. The third narrow groove and the first auxiliary groove have the same groove width, and are disposed alternately in the tire circumferential direction in parallel.

On the other hand, in the pneumatic tires of Working Examples 17 to 31, a set of two third narrow grooves and a fifth auxiliary groove are provided in any one of the middle land portions in an embodiment in which the first auxiliary grooves and the second auxiliary grooves incline with respect to the tire width direction and form a V shape. The third narrow grooves communicate with one circumferential groove and terminate in the center of the middle land portion. The fifth auxiliary groove communicates with the other circumferential groove, terminates in the center of the middle land portion, and is disposed between the terminating end portions of each of the sets of third narrow grooves in the tire circumferential direction.

Further, in the pneumatic tires of Working Examples 32 to 35, the third narrow grooves and the fifth auxiliary groove are provided in the center land portion.

Further, in the pneumatic tire of the Working Example 17, the third narrow grooves and the fifth auxiliary groove have the same groove width, and the circumferential groove that communicates with the third narrow grooves and the circumferential groove that communicates with the fifth auxiliary groove have the same groove width. However, in the pneumatic tire of the Working Example 18, the third narrow grooves and the fifth auxiliary groove have different groove widths, and the circumferential groove that communicates with the third narrow grooves and the circumferential groove that communicates with the fifth auxiliary groove have the same width. Further, in the pneumatic tires of the Working Example 19 to 35, the third narrow grooves and the fifth auxiliary groove have different groove widths, and the circumferential groove that communicates with the fifth auxiliary groove has a narrower groove than that of the circumferential groove that communicates with the third narrow grooves.

Further, in the pneumatic tires of the Working Example 17 to 19, each of the sets of third narrow grooves and the fifth auxiliary groove are disposed in parallel. However, in the pneumatic tire of the Working Example 20, each of the sets of third narrow grooves is disposed so as to narrow toward the terminating end portions, and thus the fifth auxiliary groove is not parallel with each of the sets of third narrow grooves. Further, in the pneumatic tires of Working Example 21 to 35, each of the sets of third narrow grooves is disposed so as to spread toward the terminating end portions, and thus the fifth auxiliary groove is not parallel with each of the sets of the third narrow grooves. Then, in the pneumatic tires of the Working Examples 22 to 35, the angle A from the communicating end portions toward the terminating end portions of each of the sets of third narrow grooves is designated, and the angle α and the angle β of the fifth auxiliary groove with respect to one and the other of each of the sets of third narrow grooves, respectively, are designated.

Further, in the pneumatic tires of the Working Example 17 to 25, the third narrow grooves are each formed into one straight line. However, in the pneumatic tire of the Working Example 26, the third narrow grooves are each formed in a zigzag shape on the basis of at least two different straight lines that are continuous. Further, in the pneumatic tire of the Working Example 27, the third narrow grooves are each formed in a wave shape on the bases of at least two different curved lines that are continuous.

Further, in the pneumatic tires of the Working Examples 28 to 35, the third narrow grooves are each formed smoothly and continuously of three reference lines in the order of a first reference line, a second reference line, and a third reference line, from the communicating end portion toward the terminating end portion.

Further, in the pneumatic tires of the Working Examples 29 to 35, the angles a, b of the first reference line and the angles c, d of the third reference line are designated.

Further, in the pneumatic tires of the Working Examples 31 to 35, the width of the fifth auxiliary groove is formed so as to gradually decrease toward the terminating end portion.

Further, in the pneumatic tires of Working Examples 33 to 35, the groove width of the narrow groove is formed so as to be within a designated range of from 0.4 mm to 1.2 mm, both inclusive.

As shown by the test results given in FIGS. 7A-7C and FIGS. 8A-8C, the pneumatic tires of Working Examples 1 to 35 achieve good braking performance on a dry road surface, a wet road surface, and a snow-covered road surface.

The invention claimed is:

1. A pneumatic tire, comprising: a first circumferential groove and a second circumferential groove that are provided on a tread surface of a tread portion and extend along a tire circumferential direction while being arranged side by side in a tire width direction interposing a tire equatorial plane therebetween, and third circumferential grooves that extend along the tire circumferential direction on a vehicle inner side of the first circumferential groove and a vehicle outer side of the second circumferential groove, respectively;
   a plurality of first auxiliary grooves that is formed in the tire circumferential direction and disposed intersecting the tire circumferential direction, wherein the plurality of first auxiliary grooves extends toward a vehicle inner side through and beyond the first circumferential groove and the third circumferential groove on the vehicle inner side of the first circumferential groove, and communicates with the second circumferential groove; and
   a plurality of second auxiliary grooves that is formed only between the second circumferential groove and the third circumferential groove on the vehicle outer side of the second circumferential groove without extending into a shoulder land portion of the tread surface on the vehicle outer side of the third circumferential groove, and disposed intersecting the tire circumferential direction so as to incline in the tire width direction, a circumferentially extending groove wall of the third circumferential groove on the vehicle outer side intersecting and blocking an extension of the second auxiliary grooves across the third circumferential groove on the vehicle outer side, the circumferentially extending groove wall defining an edge of the shoulder land portion,
   wherein all lateral grooves and sipes in the shoulder land portion on the vehicle outer side of the third circumferential groove have an angle of inclination with respect to the tire width direction having an opposite sign to an angle of inclination with respect to the tire width direction of the second auxiliary grooves.

2. The pneumatic tire according to claim 1,
   the vehicle inner side and the vehicle outer side being designated when the tire is to be mounted to a vehicle, with the first circumferential groove being disposed on the vehicle inner side, and the second circumferential groove being disposed on the vehicle outer side;
   the first, the second and the third circumferential grooves defining a center land portion on the tire equatorial plane, each middle land portion on both outer sides in the tire width direction of the center land portion, and a shoulder land portion on an outer side in the tire width direction of each of the middle land portions;
   the second circumferential groove being formed with a narrower groove width than that of the first and third circumferential grooves; the first auxiliary grooves each being provided so as to pass through the third circumferential groove disposed on the vehicle inner side of the first circumferential groove, thereby passing through the shoulder land portion on the vehicle inner side, the middle land portion on the vehicle inner side, and the center land portion; and the second auxiliary grooves each being provided so as to communicate with the third circumferential groove disposed on the vehicle outer side of the second circumferential groove, thereby passing through the middle land portion on the vehicle outer side.

3. The pneumatic tire according to claim 2, further comprising a first narrow groove provided so as to extend from the shoulder land portion on the vehicle inner side, through the middle land portion on the vehicle inner side, and to the center land portion, and formed with a narrower groove width than that of the first auxiliary groove.

4. The pneumatic tire according to claim 3, wherein a plurality of the first narrow grooves are disposed as sets of a plurality of grooves arranged side by side in the tire circumferential direction, each of the first narrow grooves comprising a first end portion and a second end portion, the respective first end portions linked in the shoulder land portion on the vehicle inner side, and the respective second end portions terminating in the center land portion.

5. The pneumatic tire according to claim 2, further comprising a fourth circumferential groove that extends in a zigzag manner along the tire circumferential direction in the middle land portion on the vehicle inner side, and is formed with a narrower groove width than those of the first, the second and the third circumferential grooves.

6. The pneumatic tire according to claim 2, further comprising a plurality of third auxiliary grooves that are formed in the shoulder land portion on the vehicle outer side, arranged side by side in the tire circumferential direction, disposed intersecting the tire circumferential direction, and comprise an end portion formed away from the third circumferential groove on the vehicle outer side.

7. The pneumatic tire according to claim 2, further comprising a plurality of fourth auxiliary grooves that are formed in the center land portion and the middle land portion on the vehicle outer side, arranged side by side in the tire circumferential direction, and disposed intersecting the tire circumferential direction, each of the fourth auxiliary grooves comprising a first end portion that opens to the second circumferential groove and a second end portion that terminates in the center land portion or the middle land portion.

8. The pneumatic tire according to claim 2, further comprising a plurality of second narrow grooves that are provided in the shoulder land portion on the vehicle outer side, disposed as sets of a plurality of grooves arranged side by side in the tire circumferential direction, and disposed intersecting the tire circumferential direction, each of the second narrow grooves comprising a first end portion and a second end portion, the respective first end portions communicating with the third circumferential groove on the vehicle outer side, and the respective second end portions linked.

9. The pneumatic tire according to claim 1, wherein the first auxiliary grooves are each formed with a groove width that gradually increases in a direction away from the second auxiliary grooves, and the second auxiliary grooves are each formed with a groove width that gradually increases in a direction away from the first auxiliary grooves.

10. The pneumatic tire according to claim 1, wherein the second circumferential groove comprises chamfers on opening edges on both sides in the tire width direction.

11. The pneumatic tire according to claim 10, wherein the chamfers are each formed with a chamfer width that gradually varies in the tire circumferential direction between each of the first auxiliary grooves and between each of the second auxiliary grooves, and are disposed so as to be inverted at the opening edges on both sides of the second circumferential groove.

12. The pneumatic tire according to claim 1, further comprising, in a land portion defined by the first circumferential groove and the second circumferential groove:
a plurality of third narrow grooves; and
a fifth auxiliary groove;
the third narrow grooves being arranged side by side in the tire circumferential direction, being disposed intersecting the tire circumferential direction, communicating with the first circumferential groove, and terminating within the land portion; and the fifth auxiliary groove being disposed intersecting the tire circumferential direction, communicating with the second circumferential groove, and terminating within the land portion; and
a terminating end portion of the fifth auxiliary groove being disposed between terminating end portions of the third narrow grooves in the tire circumferential direction.

13. The pneumatic tire according to claim 12, wherein the second circumferential groove is formed with a narrower groove width than that of the first circumferential groove, and the third narrow grooves are formed with a narrower groove width than that of the fifth auxiliary groove.

14. The pneumatic tire according to claim 12, wherein the plurality of third narrow grooves comprises a set of third narrow grooves, third narrow grooves of the set of third narrow grooves being formed extending so as to spread in an angle range of from 10° to 50°, both inclusive, from communicating end portions toward the terminating end portions; and
the fifth auxiliary groove is formed extending in an angle range of from 9° to 30°, both inclusive, with respect to one third narrow groove of the set of third narrow grooves, and in an angle range of from 1° to 20°, both inclusive, with respect to another third narrow groove of the set of third narrow grooves, from the terminating end portion toward a communicating end portion.

15. The pneumatic tire according to claim 12, wherein the third narrow grooves are each formed on a basis of at least two different straight lines or curved lines that are continuous.

16. The pneumatic tire according to claim 12, wherein the third narrow grooves are each formed smoothly and continuously of three reference lines in order of a first reference line, a second reference line, and a third reference line, from a communicating end portion toward the terminating end portion.

17. The pneumatic tire according to claim 16, wherein each of the sets of third narrow grooves is formed so that, with respect to each straight line connecting the communicating end portion to the terminating end portion, each of the first reference lines that extends from the communicating end portion extends toward an inner side, and the first reference line and the straight line are formed in an angle range of from 5° to 20°, both inclusive.

18. The pneumatic tire according to claim 16, wherein each of the sets of third narrow grooves is formed so that, with respect to each straight line connecting the communicating end portion to the terminating end portion, each of the third reference lines that extends from the terminating end portion extends toward an inner side, and the third reference line and the straight line are formed in an angle range of from 5° to 20°, both inclusive.

19. The pneumatic tire according to claim 12, wherein the fifth auxiliary groove is formed with a groove width that is gradually decreasing from a communicating end portion toward the terminating end portion.

20. The pneumatic tire according to claim 12, wherein the land portion where the third narrow grooves and the fifth auxiliary groove are provided is disposed on the tire equatorial plane.

21. The pneumatic tire according to claim 12, wherein a groove width of the third narrow grooves is formed so as to be in a range of from 0.4 mm to 1.2 mm, both inclusive.

22. The pneumatic tire according to claim 1, wherein the first auxiliary grooves incline toward a first side in the circumferential direction while inclining toward the vehicle inner side and the second auxiliary grooves incline toward the first side in the circumferential direction while inclining toward the vehicle outer side.

23. The pneumatic tire according to claim 1, wherein the first auxiliary grooves and the second auxiliary grooves together form V-shaped configurations.

* * * * *